United States Patent
Kamiyama

[19]

[11] Patent Number: 5,893,139
[45] Date of Patent: Apr. 6, 1999

[54] DATA STORAGE DEVICE AND STORAGE METHOD IN WHICH ALGORITHMS ARE PROVIDED FOR CALCULATING ACCESS FREQUENCIES OF DATA

[75] Inventor: Tadanobu Kamiyama, Yokosuka, Japan

[73] Assignee: Kabushiki Kaisha Toshiba, Kawasaki, Japan

[21] Appl. No.: 681,950

[22] Filed: Jul. 30, 1996

[30] Foreign Application Priority Data

Jul. 31, 1995 [JP] Japan ................................. 7-194697

[51] Int. Cl.⁶ ............................................. G06F 12/12
[52] U.S. Cl. ........................ 711/117; 711/134; 711/136; 711/160; 711/113; 711/161
[58] Field of Search ............................. 711/133, 134, 711/136, 159, 160, 117, 122, 113, 161

[56] References Cited

U.S. PATENT DOCUMENTS

| | | | |
|---|---|---|---|
| 5,155,835 | 10/1992 | Belsan | 711/114 |
| 5,313,631 | 5/1994 | Kao | 711/141 |
| 5,355,475 | 10/1994 | Tanaka et al. | 711/117 |
| 5,495,457 | 2/1996 | Takagi | 369/30 |
| 5,584,018 | 12/1996 | Kamiyama | 711/165 |

FOREIGN PATENT DOCUMENTS

| | | |
|---|---|---|
| 0 515 073 | 11/1992 | European Pat. Off. . |
| 7-093109 | 4/1995 | Japan . |
| 92/09035 | 5/1992 | WIPO . |

*Primary Examiner*—Reginald G. Bragdon
*Attorney, Agent, or Firm*—Foley & Lardner

[57] ABSTRACT

A plurality of data storage media which are constructed in a hierarchical structure of a plurality of levels having different access times and have different access information items are provided, a data storage medium into which data is to be stored is selected according to the access frequency of data, and data is stored according to the result of selection. At the time of data relocation between the data storage media of different hierarchies or between the data storage media of the same hierarchy, one of a plurality of relocation measures is selected according to the characteristics of the data storage media and the characteristic of data to be stored and then data is relocated according to the selected relocation measure.

7 Claims, 22 Drawing Sheets

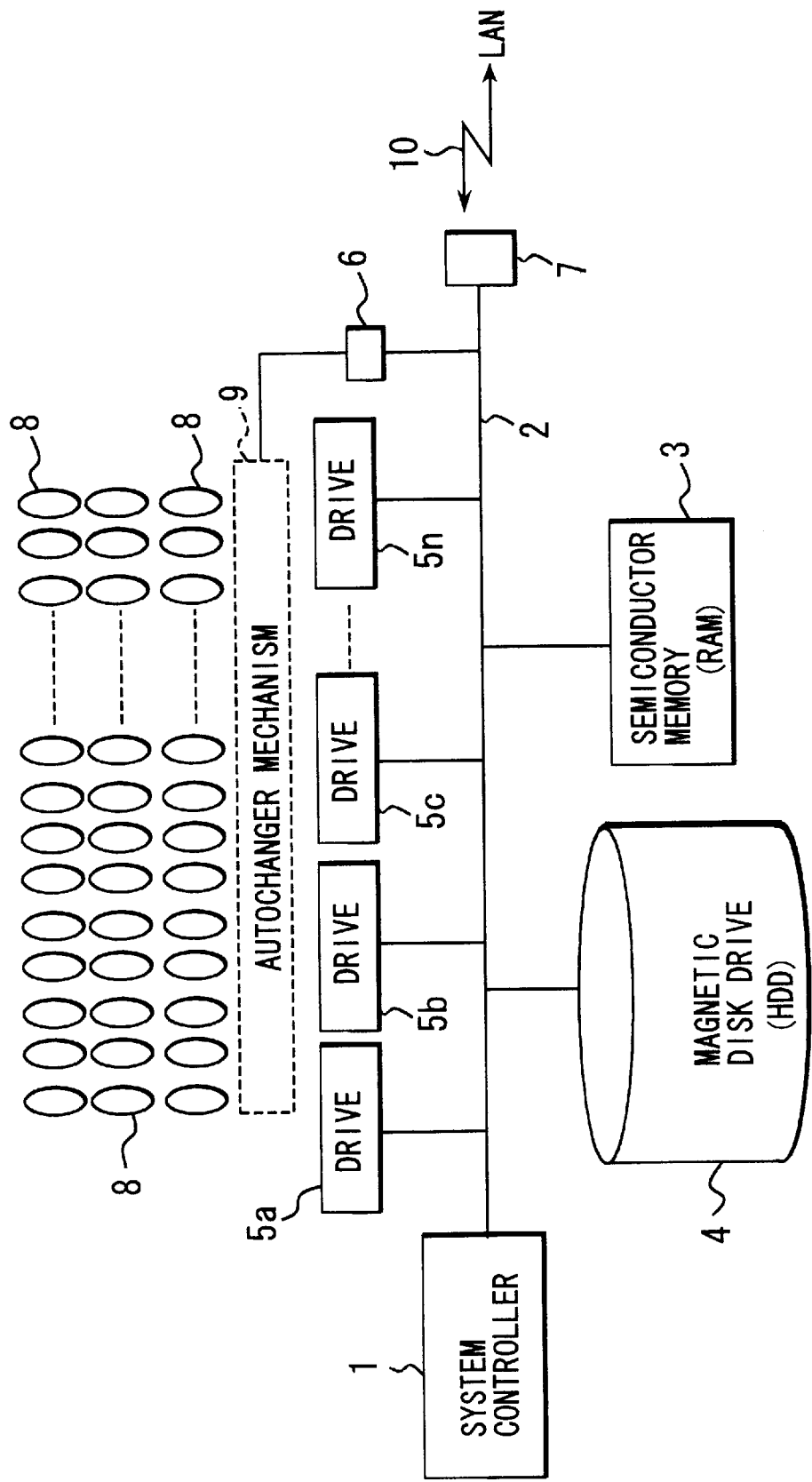
F I G. 1

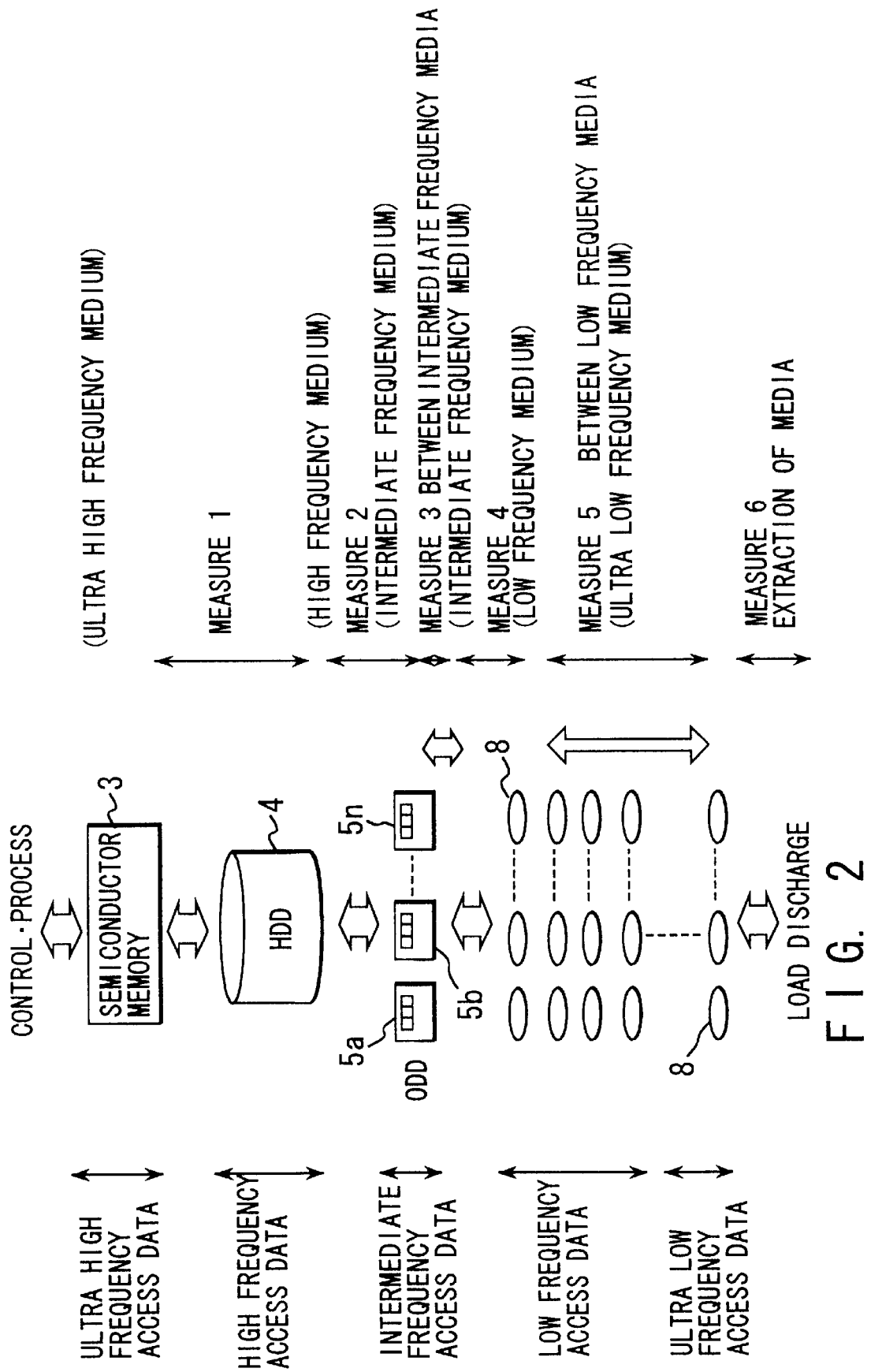

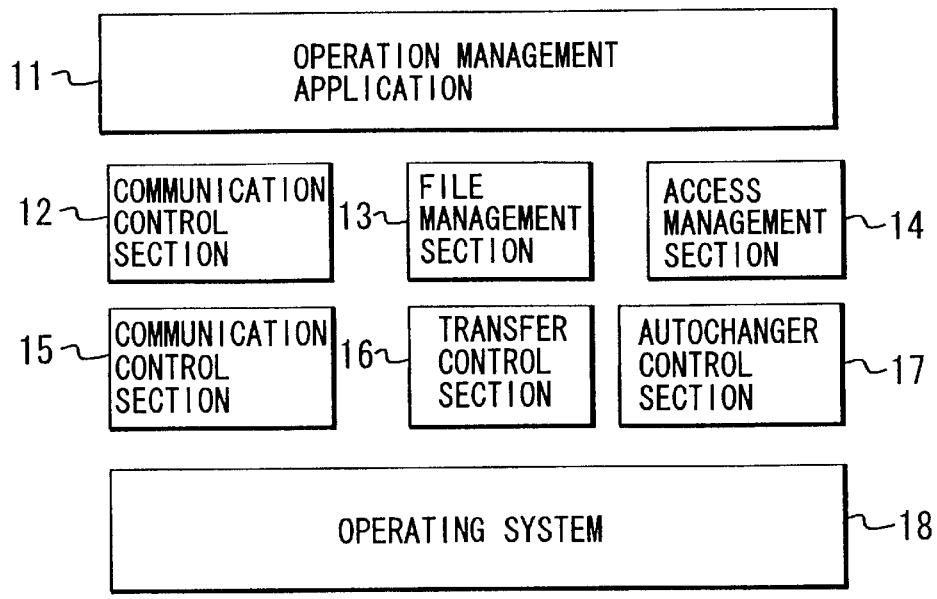
F I G. 3
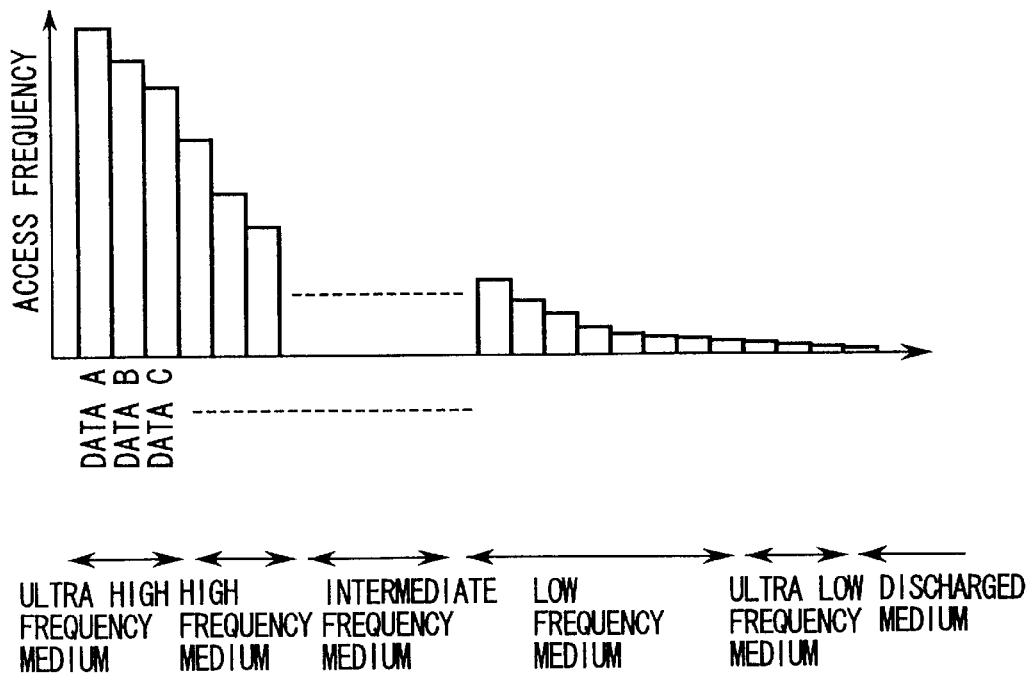
F I G. 4

| | RELOCATING MEASURE | ACCESS FREQUENCY PREDICTION METHOD | TIMING OF RELOCATION PROCESS | OBJECT OF RELOCATION PROCESS | UNIT OF RELOCATION PROCESS |
|---|---|---|---|---|---|
| 1 | ULTRA HIGH FREQUENCY MEASURE | METHOD 1 (ULTRA HIGH FREQUENCY) | SECOND~HOUR | LOW FREQUENCY BLOCK | BLOCK |
| 2 | HIGH FREQUENCY MEASURE | METHOD 2 (HIGH FREQUENCY) | HALF DAY~ ONE DAY | LOW FREQUENCY BLOCK | BLOCK |
| 3 | INTERMEDIATE FREQUENCY MEASURE | METHOD 2/3 (HIGH/INTERMEDIATE FREQUENCY) | ONE DAY~ SEVERAL DAYS | HIGH FREQUENCY BLOCK LOW FREQUENCY FILE | BLOCK/FILE |
| 4 | LOW FREQUENCY MEASURE | METHOD 3 (INTERMEDIATE FREQUENCY) | SEVERAL DAYS~ WEEK | LOW FREQUENCY FILE LOW FREQUENCY OPTICAL DISK | FILE/OPTICAL DISK |
| 5 | ULTRA LOW FREQUENCY MEASURE | METHOD 3 (LOW FREQUENCY) | WEEK~MONTH | HIGH FREQUENCY FILE LOW FREQUENCY OPTICAL DISK | FILE/OPTICAL DISK |
| 6 | CARRY-OUT MEASURE | METHOD 3 (LOW FREQUENCY) | MONTH~YEAR | OPTICAL DISK OF LOW FREQUENCY FOR LIFE | OPTICAL DISK |

F I G. 5

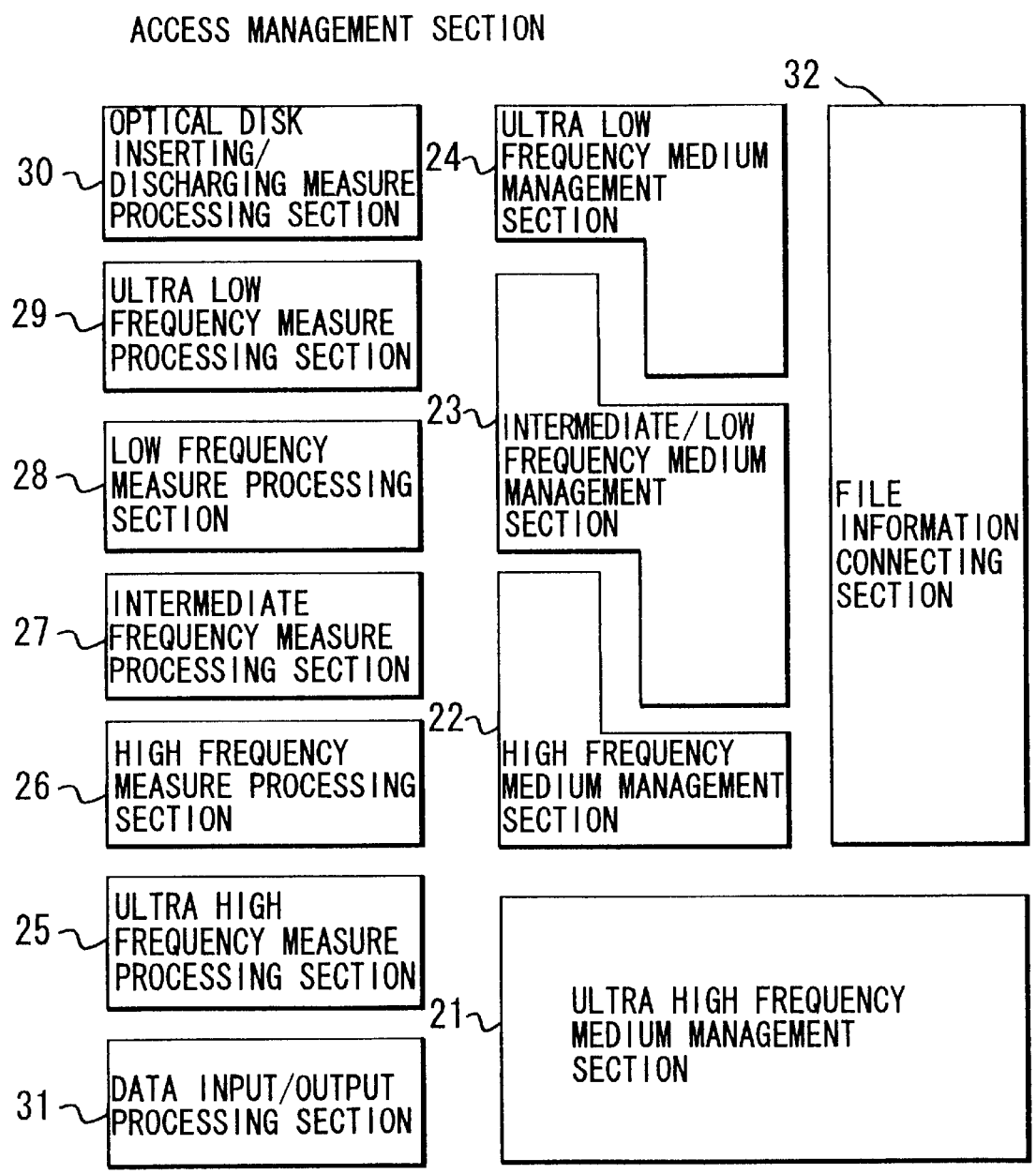
F I G. 6

FILE ID TABLE

| FILE ID | BLOCK SIZE | HEAD LOGICAL BLOCK ID | ACCESS FREQUENCY |
|---|---|---|---|
| 0023 | 244 | 001295 | |
| 1010 | 16 | 02436 | |
| 0492 | 542 | 10977 | |
| ⋮ | ⋮ | ⋮ | |

FIG. 7

LOGICAL BLOCK TABLE

| LOGICAL BLOCK ID | NEXT LOGICAL BLOCK ID |
|---|---|
| 000001 | 000002 |
| 000002 | 000569 |
| 000003 | 001296 |
| ⋮ | ⋮ |

FIG. 8

LOGICAL/PHYSICAL BLOCK CORRESPONDING TABLE

| LOGICAL BLOCK ID | MEDIUM ID | MEDIUM BLOCK ID |
|---|---|---|
| 000001 | 001 | 0001 |
| 000002 | 099 | 1055 |
| 000003 | 001 | 0002 |
| ⋮ | ⋮ | ⋮ |

~32c

F I G. 9

STORAGE BLOCK BIT MAP TABLE

| MEDIUM ID | DATA STORAGE BLOCK (BIT MAP) |
|---|---|
| 001 | 111000······1010111 |
| 002 | 111111······0000000 |
| 003 | 101110······0011110 |
| ⋮ | ⋮ |

~32d

F I G. 10

| MEDIUM BLOCK ID | FILE ID | FILE BLOCK ID | ACCESS FREQUENCY LATEST ACCESS TIME |
|---|---|---|---|
| 0001 | 0046 | 01001 | 45269345 |
| 0002 | 0028 | 09002 | 45269300 |
| 0003 | 0100 | 45544 | 45269125 |
| ------- | ------- | ------- | ------- |

| MEDIUM BLOCK ID | FILE ID | FILE BLOCK ID | ACCESS FREQUENCY | |
| --- | --- | --- | --- | --- |
| | | | LATEST ACCESS TIME | PRECEDING ACCESS TIME |
| 0001 | 0044 | 00201 | 0008556 | 0008001 |
| 0002 | 0018 | 01032 | 0105112 | 0100021 |
| 0003 | 0022 | 00357 | 0129542 | 0000215 |
| ------ | ------ | ------ | ------ | ------ |

| FILE ID | FILE FORMATION TIME | MEDIUM ID | ACCESS FREQUENCY | |
|---|---|---|---|---|
| | | | ACCESS ACCUMULATION VALUES | PRECEDING ACCESS ACCUMULATION VALUES |
| 0001 | 940205,124936 | 0192 | 2498 | 1725 |
| 0002 | 950101,000000 | 0012 | 401 | 256 |
| 0003 | 950425,085611 | 0205 | 3266 | 2111 |
| ------ | ------ | ------ | ------ | ------ |

F I G. 1 3

| MEDIUM ID | ACCESS FREQUENCY |
|---|---|
| 0001 | |
| 0002 | |
| 0003 | |
| ⋮ | ⋮ |

24a

F I G. 14

FIG. 17 MEASURE 3

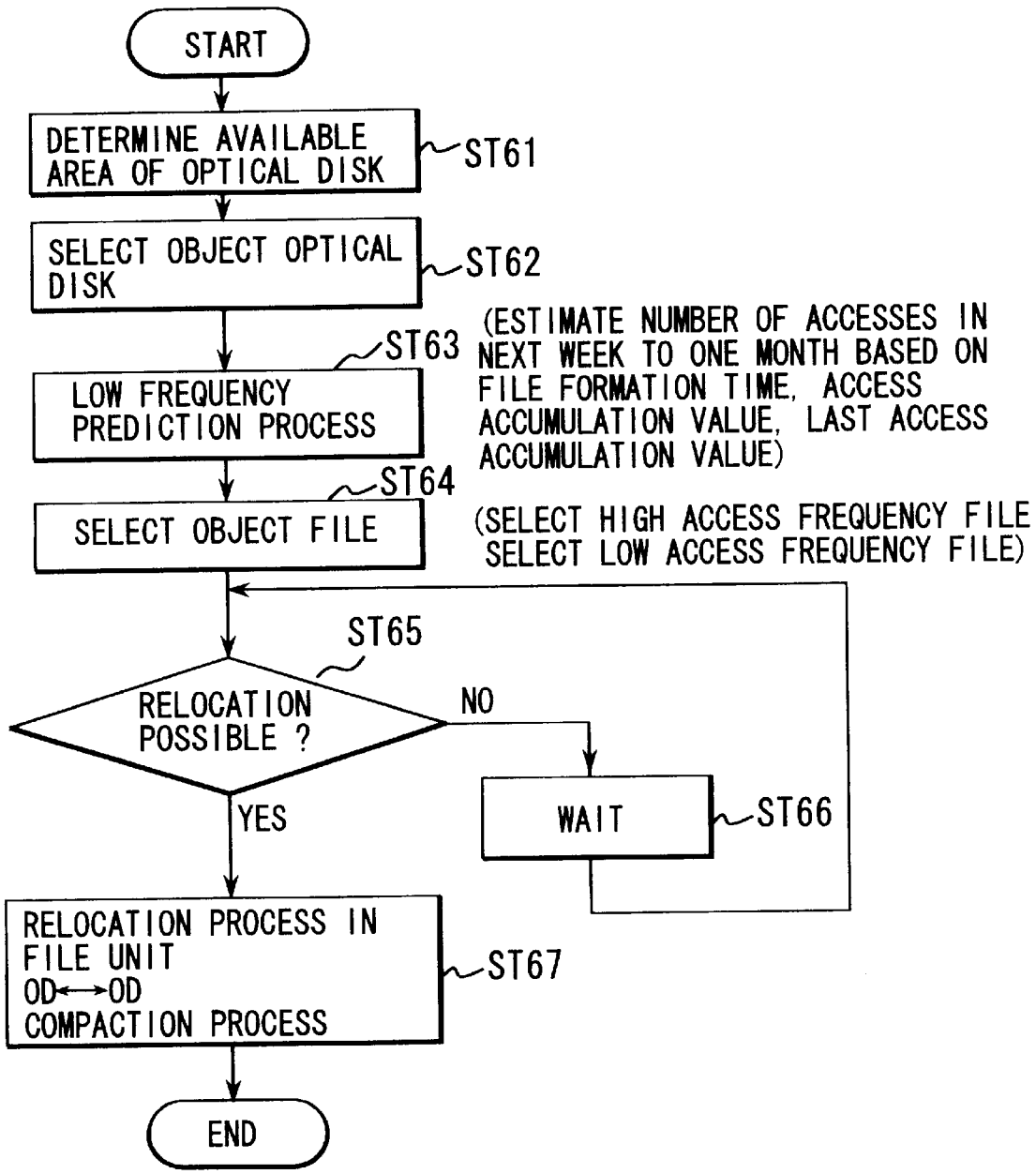
F I G. 2 2

| FILE ID | FILE FORMATION | MEDIUM ID | ACCESS FREQUENCY | | | |
|---|---|---|---|---|---|---|
| | | | ACCESS FREQUENCY COUNTING STARTING TIME | PRESENT ACCESS ACCUMULATION VALUE | LAST ACCESS ACCUMULATION VALUE | BEFORE-LAST ACCESS ACCUMULATION VALUE |
| 0001 | 940205, 124936 | 0192 | 950431, 120015 | 2498 | 1725 | 1500 |
| 0002 | 950101, 000000 | 0012 | 950101, 000000 | 461 | 256 | 230 |
| 0003 | 950425, 085611 | 0205 | 950425, 085613 | 3266 | 2111 | 1011 |
| ---- | ---- | ---- | ---- | ---- | ---- | ---- |

21a'

F I G. 2 5

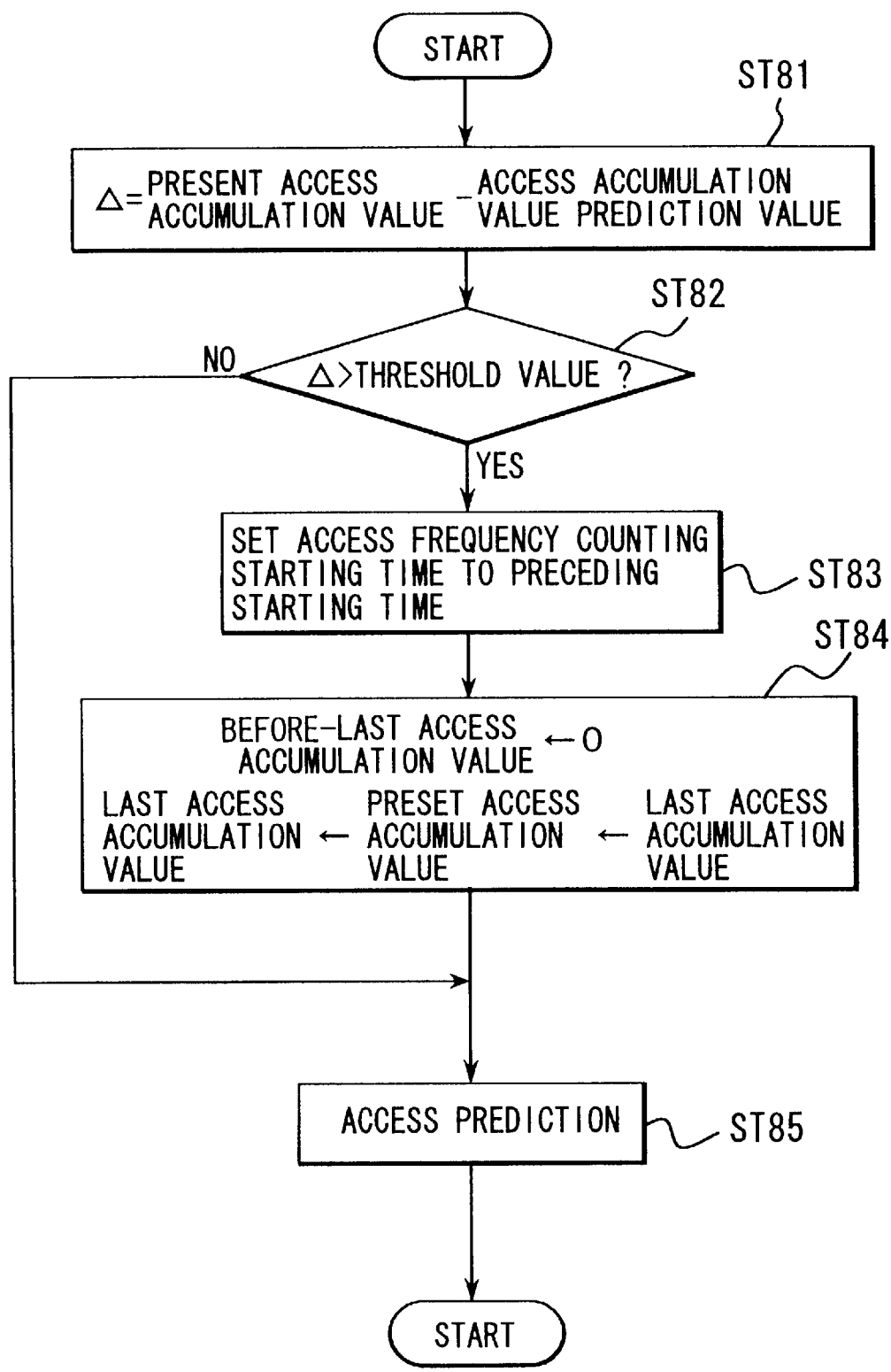
F I G. 2 6

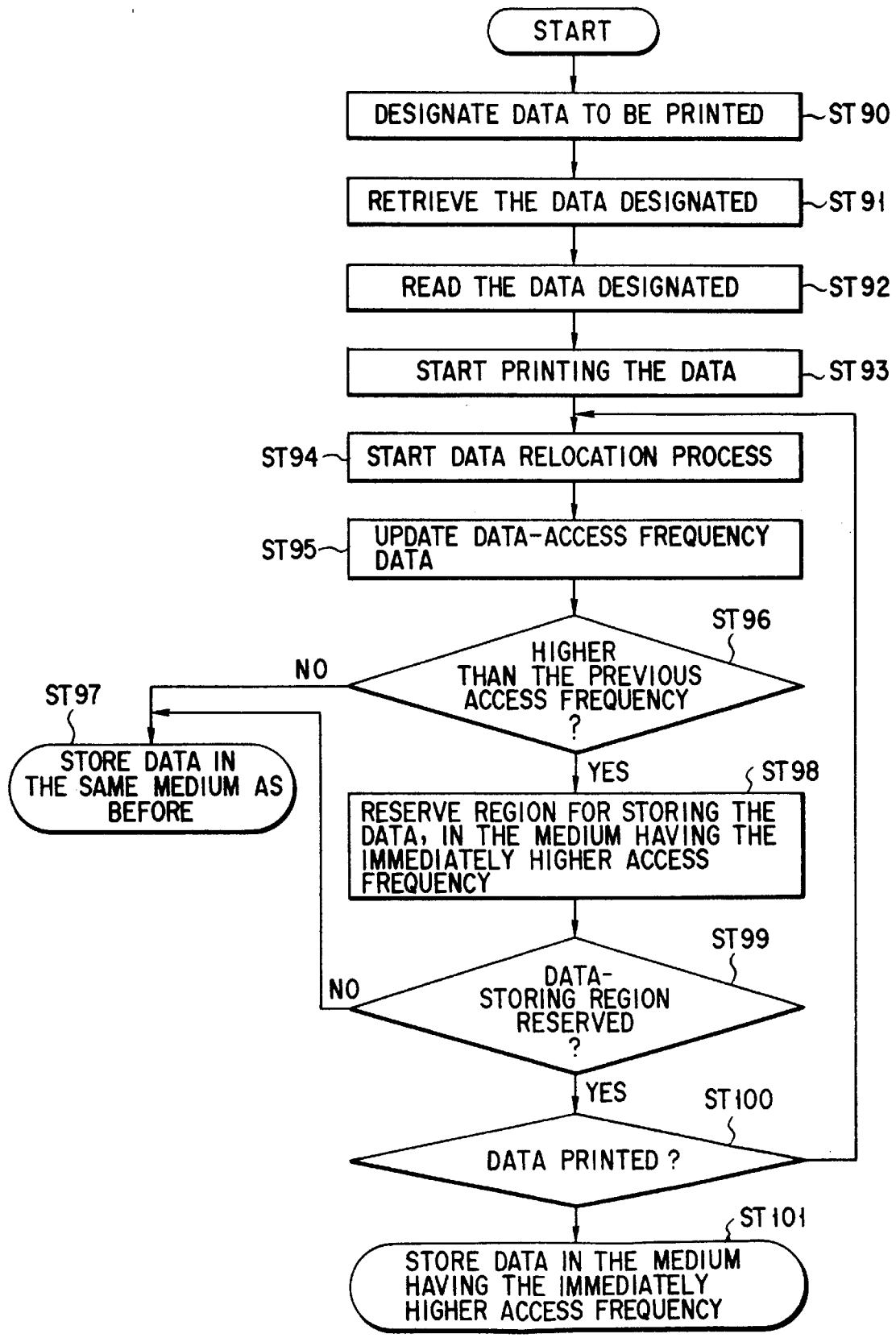
F I G. 28

DATA STORAGE DEVICE AND STORAGE METHOD IN WHICH ALGORITHMS ARE PROVIDED FOR CALCULATING ACCESS FREQUENCIES OF DATA

BACKGROUND OF THE INVENTION

1. Field of the Invention

This invention relates to a data storage device with a hierarchical structure corresponding to the processing speed and a method for storing data into a plurality of data storage media provided in the data storage device according to the access frequency.

2. Description of the Related Art

Recently, the need for data storage devices with a large memory capacity increases and various types of storage devices are proposed and manufactured (refer to "Advent of Two Types of File Server Dedicated Devices Used in Large-Scale Network", Electronics, 1991. 4. 15 No. 525). However, these dedicated devices are extremely expensive.

In order to realize the data storage device with large capacity at low cost, it is advantageous to realize the device by combining a portable type data storage media of large capacity and an autochanger.

However, in general, since the storage system using the autochanger requires a long time for changing the media and the access speed is low, various designs are made (Jpn. Pat. Application No. 5-238437, Jpn. Pat. Application No. 6-45486, Jpn. Pat. Application No. 6-207771).

It is also a common practice to use a data storage medium such as a cache and hierarchically store data, and various designs are proposed to serve the purpose (refer to Proceedings of the 1993 ACM SIGMOD vol. 22, No. 2, pp 297 to 306, "The LRU-K Page Replacement Algorithm For Database Disk Buffering", Jpn. Pat. Appln. KOKOKU Publication No. 5-71976).

Data storage in a hierarchical form (multistage form) is effective to enhance the access speed and the performance can be improved by data storage in a multistage form. The hierarchy is determined according to the order of a semi-conductor memory (cache memory), a magnetic disk device, an optical disk loaded on the optical disk drive, and an optical disk received in the housing portions (shelves) of the autochanger and data is stored according to the access frequency in the hierarchical order.

However, it naturally becomes necessary to place storage data of each hierarchy in optimum locations since the access frequencies and the access performances required by the users are different.

In the prior art, optimization of storage data for the characteristic of each hierarchy is not always effected, and as a result, it becomes impossible to commonly provide high performance services to every data stored although the performance is high as a whole.

Various proposals have been made to improve the performance (refer to Jpn. Pat. Application No. 5-238437, Jpn. Pat. Application No. 6-45486, Jpn. Pat. Application No. 6-207771), but in this invention, an attempt is made to optimize the storage data in the hierarchies so as to further improve the performance.

SUMMARY OF THE INVENTION

An object of this invention is to provide a data storage device capable of optimizing the relocation process of data with respect to a plurality of types of data storage media which are constructed in a hierarchical form according to the processing speed.

In order to achieve the above object, according to one aspect of the present invention, there is provided a data storage system comprising: a plurality of data storage means having different speeds for access to data stored in the data storage means and constituting a hierarchical structure; access frequency determining means for determining the frequencies of access to data items stored in the data storage means; and means for relocating the data items among the data storage means in accordance with characteristics of those of the data storage means which store data items accessed and with the access frequencies of the data items which have been determined by the access frequency determining means.

According to another aspect of the present invention, there is provided a data storage device comprising: first storage means having a first access speed, for storing data blocks having first access frequency; first prediction means for predicting a future access frequency of each of the data blocks stored in the first storage means according to a first algorithm; second storage means having a second access speed, for storing data blocks having second access-frequency; second prediction means for predicting a future access frequency of each of the data blocks stored in the second storage means according to a second algorithm; third storage means having a third access speed, for storing data blocks having third access-frequency; first relocation means for relocating into the second storage means those of the first access-frequency data blocks stored in the first storage means which are determined to have a low frequency in the future by the first prediction means; and second relocation means for relocating into the third storage means those of the second access-frequency data blocks stored in the second storage means which are determined to have a low frequency in the future by the second prediction means.

In this invention, it is possible to provide a high performance and highly flexible data storage device in which the management of the storage media according to the life characteristics of data to be stored can be attained, high performance access can be made for data to be accessed at a high frequency, and the careful management can be provided for low frequency access data according to the life characteristics of the data and which can cope with the record management using an optical disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a diagram showing the schematic construction of a data storage device;

FIG. 2 is a diagram showing the schematic construction of the hierarchical structure of the data storage device for illustrating a first embodiment of this invention;

FIG. 3 is a diagram showing the construction of a system control program provided for a system controller;

FIG. 4 is a diagram showing the relation between the access frequency of each data and storage media;

FIG. 5 is a diagram for illustrating the conditions of the measures for data relocation between the storage media;

FIG. 6 is a diagram showing the construction of access management means;

FIG. 7 is a diagram for illustrating a file ID table;

FIG. 8 is a diagram for illustrating a logical block table;

FIG. 9 is a diagram for illustrating a logical/physical block corresponding table;

FIG. 10 is a diagram for illustrating a storage block bit map table;

FIG. 11 is a diagram for illustrating a management information table of an ultra high frequency medium management section;

FIG. 12 is a diagram for illustrating a management information table of a high frequency medium management section;

FIG. 13 is a diagram for illustrating a management information table of an intermediate/low frequency medium management section;

FIG. 14 is a diagram for illustrating a management information table of an ultra low frequency medium management section;

FIG. 22 is a flowchart for illustrating the ultra low frequency measure (measure 5);

FIG. 25 is a diagram for illustrating a management information table of an ultra high frequency medium management section;

FIG. 26 is a flowchart for illustrating the re-correcting process for the access frequency according to the re-activation;

FIG. 28 is a flowchart for illustrating the operation of the system in FIG. 27.

DETAILED DESCRIPTION OF THE PREFERRED EMBODIMENTS

Figure 15:
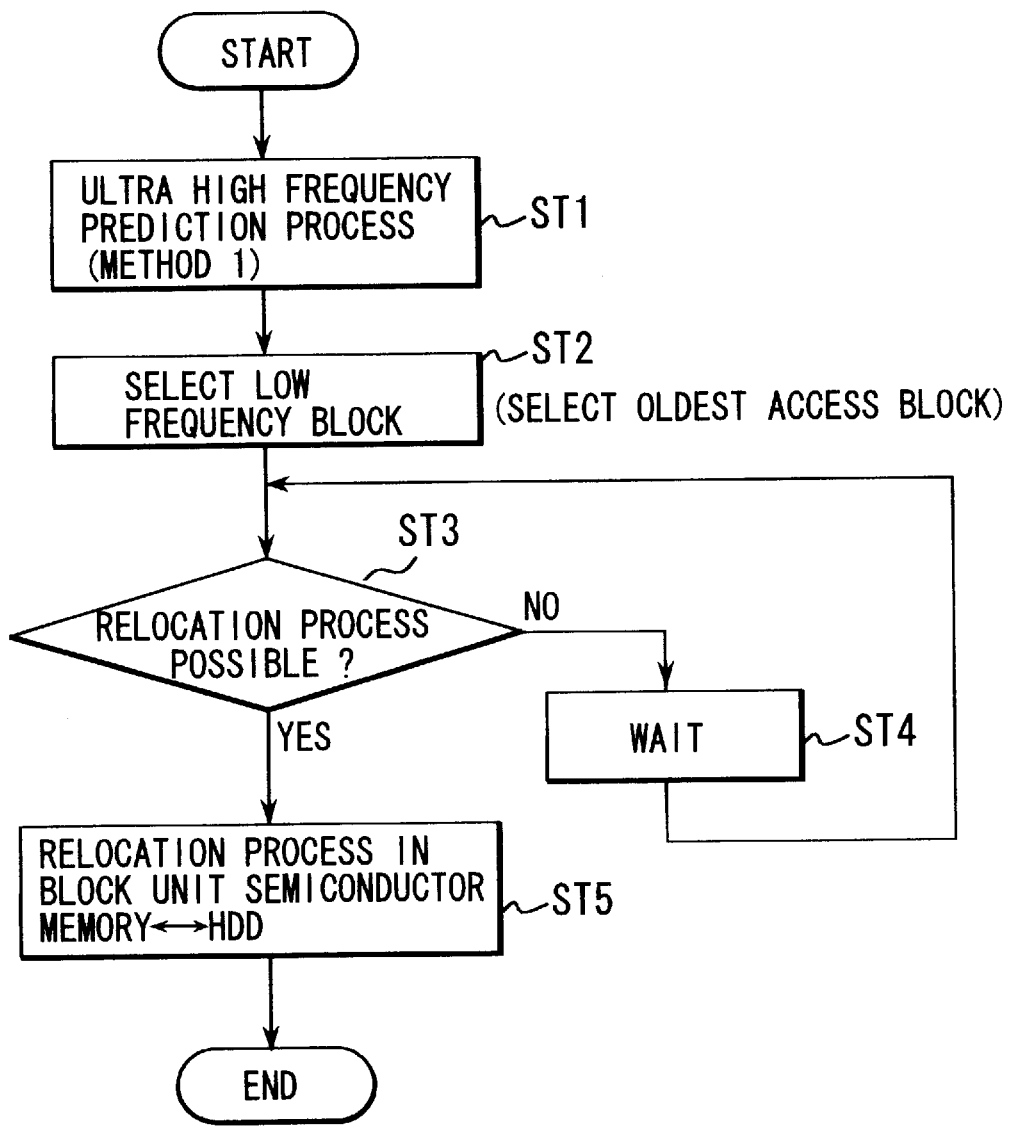
FIG. 15 is a flowchart for illustrating the ultra high frequency measure (measure 1)

There will now be described embodiments of this invention with reference to the accompanying drawings.

FIG. 1 shows the construction of a storage server as a data storage device of this invention. In the data storage device, a system controller 1 including a CPU (not shown) and a main memory, for controlling the entire operation of the data storage device is provided.

The system controller 1 is connected to a semiconductor memory (RAM) 3 as a cache memory, magnetic disk drive (HDD) 4, optical disk drives 5a to 5n, autochanger controller 6, and communication interface 7 via a bus 2.

The magnetic disk drive 4 effects the process for storing or reading out data into or from the self-contained magnetic disks. In the magnetic disks, various types of management information items are stored.

The optical disk drives 5a to 5n permit optical disks 8 to be loaded therein or unloaded therefrom by use of an autochanger mechanism (accessor) 9 and permit data to be stored into or read out from the loaded optical disks 8.

The autochanger controller 6 controls the autochanger mechanism 9 so as to take out one of the optical disks 8, - - - as portable type media group received in a plurality of housing portions (not shown) as shelves of the autochanger and load the selected optical disk into one of the optical disk drives 5a to 5n, or take out the optical disk 8 loaded in one of the optical disk drives 5a to 5n and set it back into one of the housing portions.

The communication interface 7 is connected to a LAN 10 to receive a command transmitted from an external device via the LAN 10 and transmit the result of processing.

The semiconductor memory 3 is an ultra high frequency medium (ultra high speed storage medium) in which ultra high frequency access data is stored, the magnetic disk of the magnetic disk drive 4 is a high frequency medium (high speed storage medium) in which high frequency access data is stored, the optical disk 8 loaded in the optical disk drives 5a to 5n is an intermediate frequency medium (intermediate speed storage medium) in which intermediate frequency access data is stored, and the optical disks 8 received in the housing portions are a low frequency medium (low speed storage medium) in which low frequency access data is stored and an ultra low frequency medium (low speed storage medium) in which ultra low frequency access data is stored, and thus the hierarchical structure shown in FIG. 2 is constructed. The optical disk 8 which is received in the housing portion becomes a discharged medium if it is discharged from the housing portion.

FIG. 3 shows the construction of a system control software provided for the system controller 1.

That is, it includes an operation management application 11, a communication control section 12 for effecting the high-order protocol process, a file management section 13 for managing data stored in the system as a file, an access management section 14, a communication control section 15 for effecting the low-order protocol process and the hardware control of the communication interface 7, a transfer control section 16 for controlling the transfer of data via the bus 2, an autochanger control section 17 for controlling the autochanger control section 6, and an operating system (OS) 18.

The access management section 14 is used as a main portion of this invention and includes various relocation sections for optimizing the storage and management of the access frequency of data, and gives an instruction to the low-order transfer control section 16 and autochanger control section 17 to optimize the storage location of the storage data.

The file management section 13 is a file system and generally provided in a standard operating system. In the file management section 13, for example, directory information of the file, access control information of read permission/inhibition and write permission/inhibition and the like are managed and the file IDs are determined as fixed information of the file for the respective files.

Next, this invention is explained in detail.

Generally, when data (such as a file, data block, sector) is stored, the access frequency therefor is not uniform. Such data has various access frequencies depending on the characteristic of the data. The word "access"means the reading or writing of data, or any operation of using data in whatever fashion. An example thereof is shown in FIG. 4.

The access frequencies are different for respective data items such as data A, data B, - - - and the arrangement of data items in the order of access frequency is shown in FIG. 4. In this case, a storage system of high cost performance can be attained by storing high access-frequency data into a high performance storage medium and storing low access-frequency data into a storage medium which is low in performance but is inexpensive.

FIG. 2 shows the method for realizing the above data arrangement. That is, data items are stored in the hierarchical structure such that ultra high frequency access data is stored into the semiconductor memory 3, high frequency access data is stored into the magnetic disk device 4, intermediate frequency access data is stored into the optical disks 8 loaded in the optical disk drives 5a to 5n, low frequency access data is stored into the low frequency optical disks 8 received in the housing portions, and ultra low frequency access data is stored into the ultra low frequency optical disks 8 received in the housing portions.

However, data items independently stored do not always have the access frequencies shown in FIG. 4. That is, the data access frequency varies with time. Further, new data may be stored from an external device or stored data may be deleted.

Thus, stored data dynamically varies with time and the order shown in FIG. 4 is not always maintained. Therefore, in order to keep the access performance high, it is necessary to always effect the process for following the above variation, that is, optimizing the data arrangement. It is necessary to attain the optimum arrangement of data in the respective storage media such as the ultra high frequency storage medium and the high frequency storage medium or the high frequency storage medium and the intermediate frequency storage medium according to the dynamism of data items stored in the respective storage media. Thus, it can maintain the high access performance as the storage server.

In this case, optimum measures must be individually taken for control of the data relocation between the storage media according to the features of data items stored. That is, the cost for a series of processes for ultra high frequency access data must be suppressed to a minimum, that is, the series of processes must be lightly effected at high speed, and in a case where the optical disk 8 loaded in the optical disk drive 5a, - - - is removed and set into the housing portion or in a case where the optical disk is carried out from the storage server, it is necessary to accurately predict a case wherein the frequency of access to the optical disk 8 is extremely low, or substantially or practically no access is made to the optical disk 8, or completely no access is made to the optical disk 8.

That is, in the process for optimization of the data arrangement, it is necessary to independently select a measure or algorithm according to the characteristic of data and the storage medium used for storage.

The first feature of this invention lies in the above point and FIG. 5 shows an example of a method for discretely selecting the measures of data relocation between the storage media.

In this embodiment, six types of measures are provided for the measures of data relocation between the storage media as shown in FIG. 5.

That is, the ultra high frequency measure (1) for relocation between the ultra high frequency storage medium (semiconductor memory) and the high frequency storage medium (magnetic disk drive 4), the high frequency measure (2) for relocation between the high frequency storage medium (magnetic disk drive 4) and the intermediate frequency storage medium (optical disk 8 loaded in the optical disk drive 5a, - - - ), the intermediate frequency measure (3) for relocation between the intermediate frequency storage media (optical disks 8 loaded in the optical disk drives 5a, - - - ), the low frequency measure (4) for relocation between the intermediate frequency storage medium (optical disk 8 loaded in the optical disk drive 5a, - - - ) and the low frequency storage medium (optical disk 8 loaded in the housing portion), the ultra low frequency measure (5) for relocation between the low frequency storage media (optical disks 8 loaded in the housing portion), and the carry-out measure (6) for selecting the low frequency storage medium (optical disk 8 loaded in the housing portion) and carrying out the ultra low frequency storage medium (optical disk 8 loaded in the housing portion) are discretely defined in this example, and the access frequency prediction methods, timings for effecting the relocation process, objects of the relocation process, and units of the relocation process are changed as shown in FIG. 5.

That is, in the ultra high frequency measure, the access frequency prediction method is the method 1 (for ultra high frequency), the timing of the relocation process is set to one second to one hour, the object of the relocation process is a data block (which is hereinafter simply referred to as a block) of relatively low frequency in the ultra high frequency storage medium, and the unit of the relocation process is set to a block.

In the high frequency measure, the access frequency prediction method is the method 2 (for high frequency), the timing of the relocation process is set to a half day to one day, the object of the relocation process is a block of relatively low frequency in the high frequency storage medium, and the unit of the relocation process is set to a block.

In the intermediate frequency measure, the access frequency prediction method is the methods 1 and 2 (for high/intermediate frequency), the timing of the relocation process is set to one day to several days, the object of the relocation process is a block of relatively high frequency in the intermediate frequency storage medium and a file of relatively low frequency, and the unit of the relocation process is set to a block/file.

In the low frequency measure, the access frequency prediction method is the method 3 (for intermediate frequency), the timing of the relocation process is set to several days to one week, the object of the relocation process is a file of relatively low frequency in the low frequency storage medium and an optical disk of relatively low frequency, and the unit of the relocation process is set to a file/optical disk.

In the ultra low frequency measure, the access frequency prediction method is the method 3 (for low frequency), the timing of the relocation process is set to one week to one month, the object of the relocation process is a file of relatively high frequency in the ultra low frequency storage medium and an optical disk of relatively low frequency, and the unit of the relocation process is set to a file/optical disk.

In the carry-out measure, the access frequency prediction method is the method 3 (for low frequency), the timing of the relocation process is set to one month to one year, the object of the relocation process is an optical disk of low frequency for the entire life, and the unit of the relocation process is set to an optical disk.

The construction of the access management section 14 for processing the relocation measures shown in FIG. 5 is explained with reference to FIG. 6. As shown in FIG. 6, the access management section 14 includes an ultra high frequency medium managing section 21, high frequency medium managing section 22, intermediate/low frequency medium managing section 23, ultra low frequency medium managing section 24, ultra high frequency measure processing section 25, high frequency measure processing section 26, intermediate frequency measure processing section 27, low frequency measure processing section 28, ultra low frequency measure processing section 29, optical disk inserting/discharging measure processing section 30, data input/output processing section 31, and file information connecting section 32.

The ultra high frequency measure processing section 25, high frequency measure processing section 26, intermediate frequency measure processing section 27, low frequency measure processing section 28, ultra low frequency measure processing section 29 and optical disk inserting/discharging measure processing section 30 work out the above respective measures based on management information items of the ultra high frequency medium managing section 21, high frequency medium managing section 22, intermediate/low frequency medium managing section 23 and ultra low frequency medium managing section 24.

The measure processing sections 25 to 30 control the low-order transfer control section 16 and autochanger control section 17 and cause them to effect the various relocation measure processes. The data input/output processing section 31 effects the process for inputting and outputting with respect to the communication control section 12 and connected storage medium. The above operation, particularly, the process for inserting and discharging the optical disk 8 into or from the storage system is effected in combination with the high-order operation management application 11.

The file information connecting section 32 links the access management section 14 and the standard file management section 13 provided for the operating system 18 of the storage system and links them via a file ID of a concrete file managed by the file management section 13.

Next, data used in the file information connecting section 32, ultra high frequency medium managing section 21, high frequency medium managing section 22, intermediate/low frequency medium managing section 23 and ultra low frequency medium managing section 24 is explained in detail.

First, the file information connecting section 32 is explained. The file information connecting section 32 has a file ID table 32a shown in FIG. 7, a logical block table 32b shown in FIG. 8, a logical/physical block corresponding table 32c shown in FIG. 9 and a storage block bit map table 32d shown in FIG. 10.

In the file ID table 32a, as shown in FIG. 7, the block size and head logical block ID as the storage location of data are stored for each of the file IDs determined for the respective files. In this example, the "block" corresponds to one of a plurality of sectors in a case where the storage medium is a disk. Further, in the file ID table 32a, the access frequency information for each file is stored.

In the logical block table 32b, as shown in FIG. 8, block chains used for managing the logical block IDs in the file ID table 32a and each including a pair of pointers indicating the logical block ID and a next logical block ID with respect to the former logical block ID are described. The number of block chains can be predicted based on the block size of FIG. 7.

In the logical/physical block corresponding table 32c, as shown in FIG. 9, medium IDs as physical block IDs indicating actual storage locations corresponding to logical block IDs indicating storage locations of data and medium block IDs are stored and thus the logical blocks and the physical blocks are linked to each other. As a result, when the relocation process for storage data is effected, it is only necessary to update the physical block ID in the logical/physical block corresponding table 32c and the change of various management information items can be suppressed to minimum.

In the storage block bit map table 32d, as shown in FIG. 10, data storage block bit maps corresponding to the storage medium IDs of the respective storage media are stored. Thus, those of the blocks of the storage media in which data is stored can be easily detected.

Next, the ultra high frequency medium managing section 21 is explained. The ultra high frequency medium managing section 21 includes a management information table 21a shown in FIG. 11.

In the management information table 21a, as shown in FIG. 11, file IDs, file block IDs and latest access times as access frequencies are stored in correspondence to the medium block IDs determined for the respective medium blocks in the ultra high frequency media. Thus, data in one of the blocks in one of the files which corresponds to data stored in one of the medium block IDs determined for the respective medium blocks in the ultra high frequency media and the access frequency of the data are collectively managed. The latest access time is expressed in the unit of 0.1 sec based on the absolute time managed by the device.

Next, the high frequency medium managing section 22 is explained. The high frequency medium managing section 22 includes a management information table 22a shown in FIG. 12.

In the management information table 22a, as shown in FIG. 12, file IDs, file block IDs, latest access times and preceding access times thereof as access frequencies are stored in correspondence to the medium block IDs determined for the respective medium blocks in the high frequency media. Thus, data in one of the blocks in one of the files which corresponds to data stored in one of the medium block IDs determined for the respective medium blocks in the high frequency media and the access frequency of the data are collectively managed.

The management information table 21a is substantially the same as the management information table 22a, but the contents of the access frequency information are different, and the measures are different in that the measure in the management information table 21a is made simpler to cope with the high speed process and high accuracy is required in the measure in the management information table 22a.

Next, the intermediate/low frequency medium managing section 23 is explained. The intermediate/low frequency medium managing section 23 includes a management information table 23a shown in FIG. 13.

In the management information table 23a, as shown in FIG. 13, file formation times, medium IDs, latest access accumulated values and preceding access accumulated values thereof as access frequencies are stored in correspondence to the file IDs determined for the respective files in the intermediate frequency media and low frequency media. Thus, the media in which the respective files are stored and the access frequencies thereof are managed for each file.

Next, the ultra low frequency medium managing section 24 is explained. The ultra low frequency medium managing section 24 includes a management information table 24a shown in FIG. 14.

In the management information table 24a, as shown in FIG. 14, access frequencies are stored in correspondence to the medium IDs determined for the respective low frequency media. Thus, the access frequencies for the respective low frequency media are managed.

Next, the operations of the ultra high frequency measure processing section 25, high frequency measure processing section 26, intermediate frequency measure processing section 27, low frequency measure processing section 28, ultra low frequency measure processing section 29, and optical disk inserting/discharging measure processing section 30 are explained in detail.

First, the measure 1 as the ultra high frequency measure by the ultra high frequency measure processing section 25 is explained with reference to the flowchart shown in FIG. 15.

The ultra high frequency measure effects the process of data relocation between the ultra high frequency medium (semiconductor memory 3) and the high frequency medium (magnetic disk device 4) based on information stored in the management information table 21a of the ultra high frequency medium management section 21.

The process is started at two chances. The first chance occurs when storage data in the ultra high frequency medium becomes full or the amount of the data exceeds a specified value and it becomes necessary to exclude data and the second chance occurs when the optimization event which the system periodically starts in order to optimize the data arrangement is specified. The periodic event is caused based on the timing of the relocation process specified as shown in FIG. 5 and, in the case of the ultra high frequency medium, it is caused in the unit of second to the unit of hour at maximum as shown in FIG. 5.

If the above process is started in the above condition, the ultra high frequency prediction process (method 1) is effected and the latest access time in the management information table 21a shown in FIG. 11 is updated (ST1). Then, one of the individually stored data blocks in which the latest access time is the oldest is selected as a lowest frequency block and the relocation process is started (ST2). At this time, if the destination area of the relocation is full of data or execution of the process is made impossible for some reason, the execution of the process is waited (ST4). If the relocation process can be performed, data will be relocated between the semiconductor memory and the hard disk (ST5).

Next, the ultra high frequency prediction process (method 1) is explained. It is required to effect the ultra high frequency prediction process at high speed. A simple and general process is LRU (Least Recently Used Algorithm) and is a prediction method in which the possibility of next access for most recently accessed data is determined to be the highest. That is, the access frequency of each block is recorded as time at which the block is accessed each time the block is accessed, and a block having the oldest access time is selected as a block to be relocated in a medium of a low access frequency. In this case, the latest access time recorded as access frequency in the management information table 21a is expressed in the unit of 0.1 sec based on the absolute time managed by the device.

Figure 16:
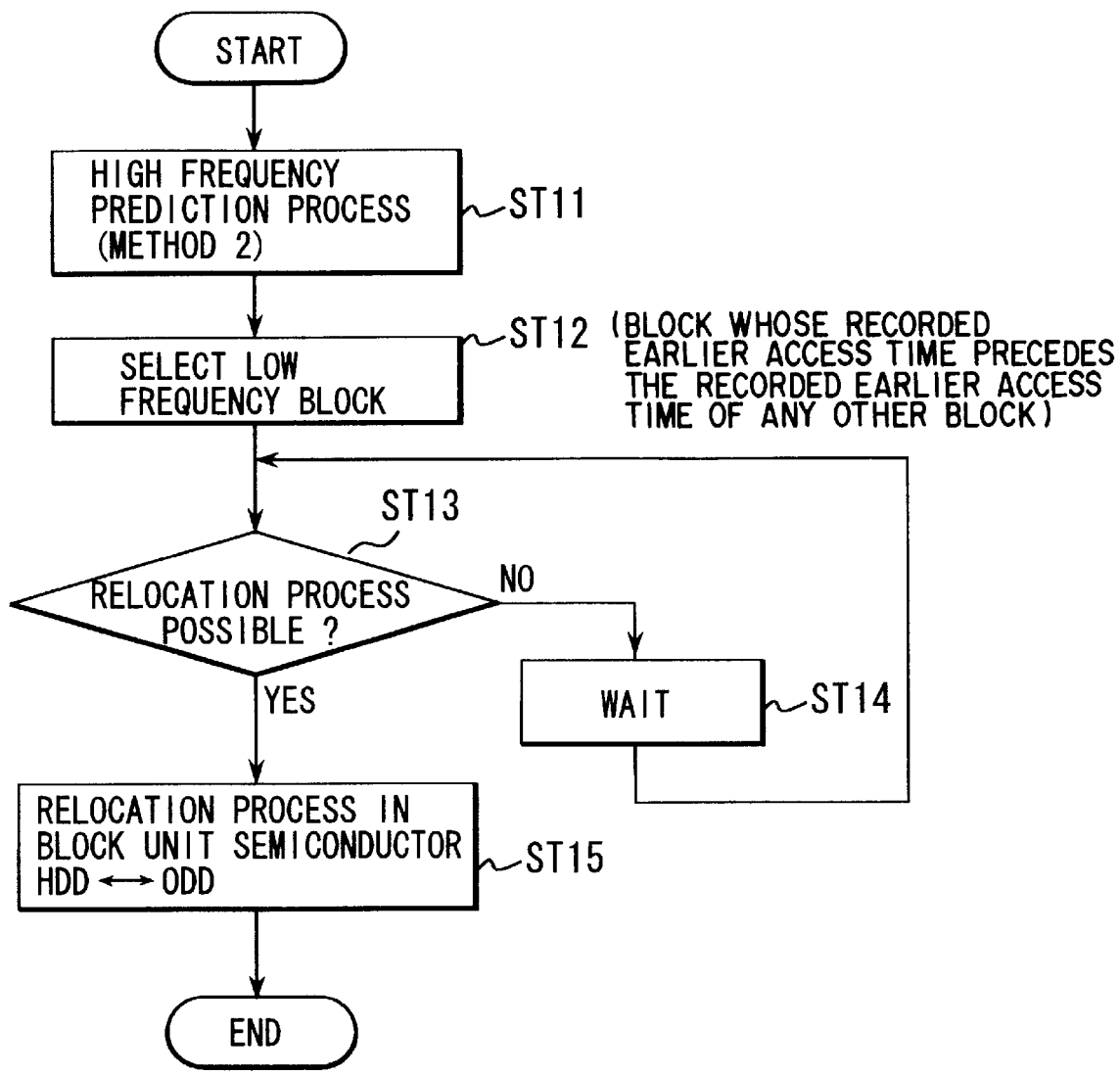
FIG. 16 is a flowchart for illustrating the high frequency measure (measure 2)

Next, the measure 2 as the high frequency measure by the high frequency measure processing section 26 is explained with reference to the flowchart shown in FIG. 16.

The high frequency measure effects the relocation process between the high frequency medium (magnetic disk device 4) and the intermediate frequency medium (optical disk 8 loaded in the optical disk drive 5a, - - - ) based on information stored in the high frequency medium management section 22.

The process is also started at two chances. The first chance occurs when storage data in the high frequency medium becomes full or the amount of the data exceeds a specified value and it becomes necessary to exclude data and the second chance occurs when the optimization event which the system periodically starts in order to optimize the data arrangement is specified. The periodic event is caused based on the timing of the relocation process specified as shown in FIG. 5 and, in the case of the high frequency medium, it is caused in the unit of hour to the unit of one day at maximum as shown in FIG. 5.

If the above process is started in the above condition, the high frequency prediction process (method 2) is effected and the latest access time and the preceding access time thereof in the management information table 22a shown in FIG. 12 are updated, or recorded (ST11). Then, one of the individually stored data blocks in which the average access frequency is the lowest (i.e., the block whose recorded earlier access time precedes the recorded earlier access time of any other block) is selected and the relocation process is started (ST12). At this time, if the destination area of the relocation is full of data or execution of the process is made impossible for some reason (ST13), the execution of the process is waited (ST14). If the relocation process is found possible (ST13), the data will be relocated between the semiconductor memory and the hard disk in units of blocks (ST15).

Next, the high frequency prediction process (method 2) is explained. Since the amount of data in the relocation process becomes larger, higher precision is required in the high frequency prediction process. In this instance, the past two access times are recorded, and the block whose access time preceding the latest access time is the oldest is regarded as one which will be next accessed at the lowest probability.

Next, the measure 3 as the intermediate frequency measure by the intermediate frequency measure processing section 27 is explained with reference to the flowchart shown in FIG. 17.

The intermediate frequency measure effects the process of data relocation between the intermediate frequency media (optical disks 8 loaded in the optical disk drives 5a, - - - ) based on information stored in the high frequency medium management section 22 and information stored in the intermediate/low frequency medium management section 23.

The intermediate frequency measure is greatly different from the ultra high frequency measure and the high frequency measure. In the system having a plurality of optical disk drives 5a, - - - as shown in FIGS. 1 and 2, the access speed and transfer speed can be enhanced by distributing data stored in this case into the plurality of optical disks 8,

- - - and simultaneously accessing the optical disks. On the other hand, the system performance can be improved by concentrating data of low frequency access on a preset optical disk 8, setting the optical disks 8 in the lower frequency access layer and loading a free optical disk 8 for storing high frequency data.

Figure 17:
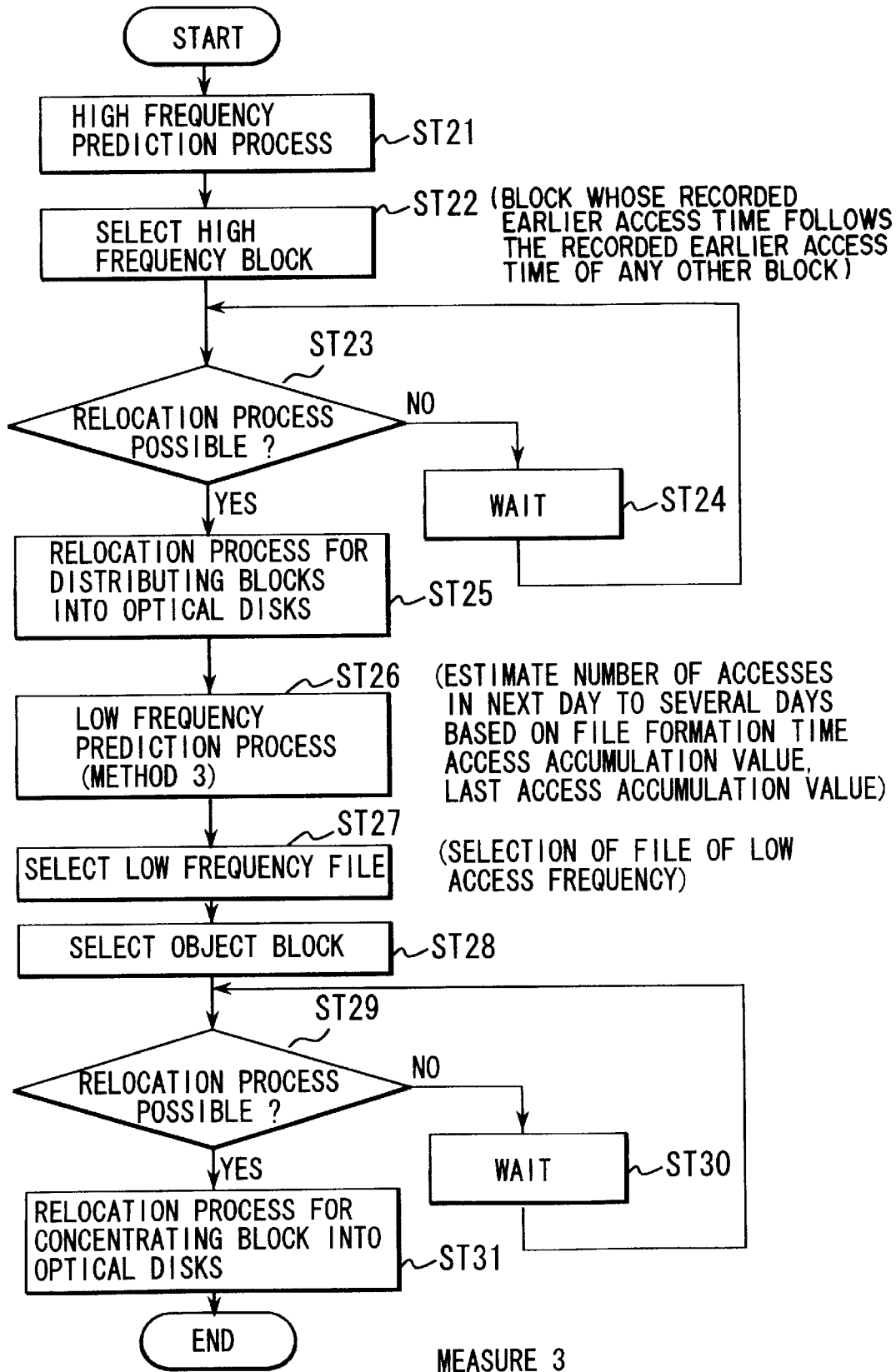
FIG. 17 is a flowchart for illustrating the intermediate frequency measure (measure 3)

Therefore, as shown in FIG. 17, the high frequency measure (method 2) is first effected (ST21) and a high frequency block is selected (ST22). That is, past two access times are recorded, and the block whose recorded earlier access time follows the recorded earlier access time of any other block is regarded as one which will be next accessed at the highest probability. It is then determined whether the relocation process can be performed or not (ST23). The relocation process remains not executed until it is determined the process can be carried out.

When the high access frequency blocks are concentrated, the relocation process for distributing them into a plurality of optical disks 8, - - - (ST25), the low frequency prediction process (method 3) which will be described later is effected (ST26), a low frequency file and an object block are selected (ST27, ST28). If the relocation process if found possible (ST29), the low access frequency file and the object block are concentrated in the preset optical disk 8 (ST31) to make ready for the later relocation process in the unit of optical disk 8.

In the concentrating operation, since it becomes difficult to effect the later data maintenance if one file data is distributed into a plurality of optical disks 8, it is preferable to concentrate one file data in one optical disk 8. Therefore, in the concentrating operation, block concentration is effected for each file and one file is stored into one optical disk. The concentrating operation and distributing operation are based on the system disclosed in Jpn. Pat. Application No. 5-238437, for example.

Next, the measure 4 as the low frequency measure by the low frequency measure processing section 28 is explained with reference to the flowchart shown in FIG. 18.

The low frequency measure effects the process of data relocation between the intermediate frequency medium (optical disk 8 loaded in the optical disk drive 5a, - - - ) and the low frequency medium (optical disk 8 received in the housing portion of the autochanger) based on information in the intermediate/low frequency medium management section 23 and the amounts of storage information of the intermediate frequency medium and the low frequency medium.

First, the total free area of the loaded media is determined (ST41), and if the total value is less than a preset value, for example, 10%, the access frequency prediction for each medium is effected (ST42) to update the medium by use of a non-use medium and enlarge a storage area. The frequency prediction is effected based on the method 1 or the method 2, for example, by use of the management table of FIG. 14. If low frequency data is concentrated by the process described before, the process of relocation for data of the low frequency medium to the selected housing portion of the autochanger is effected (ST46). In addition, the intermediate frequency prediction in the unit of file (method 3) is effected (ST47) and the relocation process in the unit of file is also effected (ST51) to optimize the data arrangement.

Next, the intermediate frequency prediction process (ST26) of the above measure 3 and the method of selection of a low frequency object file (ST27), and the intermediate frequency prediction process (ST47) of the above measure 4 and the method of selection of an object file (ST48) are explained in detail. The access frequency prediction processes (ST26, ST48) are both effected based on the same method (method 3) and this is the second feature of this invention.

The low frequency prediction process of the measure 4 is associated with the process of data relocation between the optical disk 8 loaded in the optical disk drive 5a, - - - and the optical disk 8 received in the housing portion of the autochanger. If data of relatively high frequency in the optical disk 8 loaded in the optical disk drive 5a, - - - is stored in the housing portion of the autochanger, the performance is greatly deteriorated in some cases.

Figure 19:
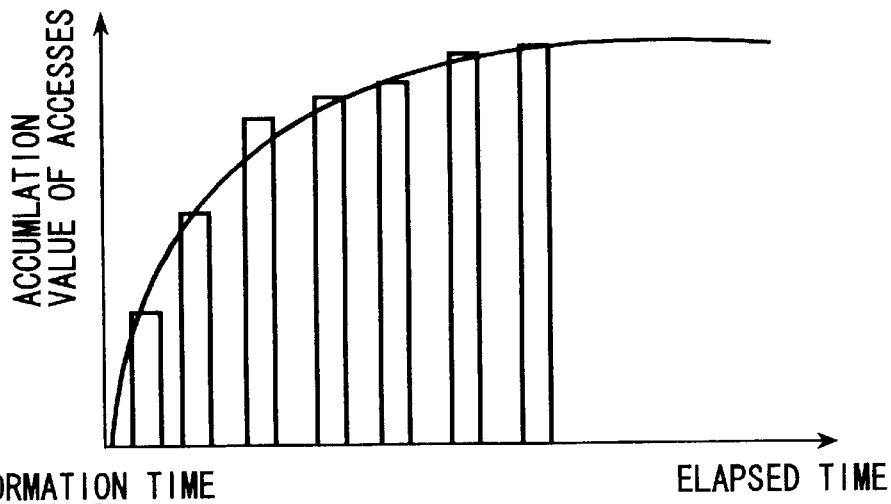
FIG. 19 is a diagram showing a variation in the accumulated value of the access frequency starting from the formation time.
Figure 20:
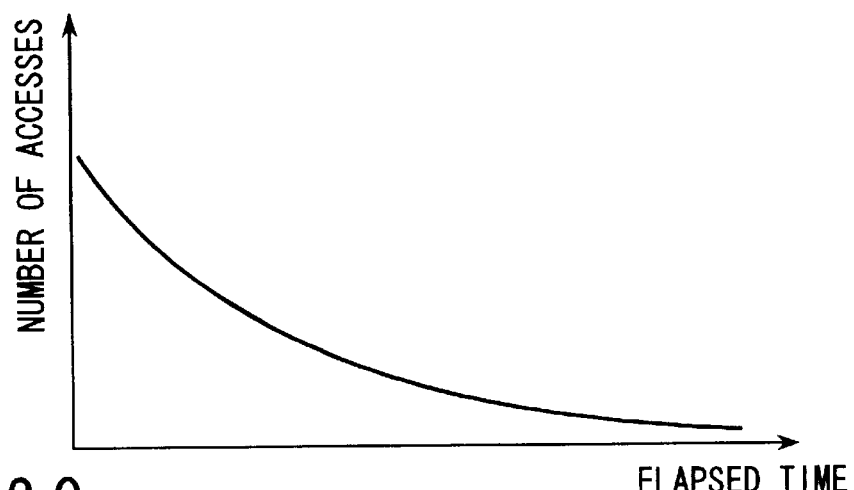
FIG. 20 is a diagram showing a variation in the accumulated value of the access frequency starting from the formation time with time.

Therefore, the individual access frequency prediction processes are required to be effected with relatively high precision. Generally, storage information has a life characteristic as shown in FIGS. 19 and 20. That is, as shown in FIG. 19, a curve which is saturated after a preset period of time can be obtained by taking an accumulated value of accesses to the information made after formation and storage of the information. A variation in the number of accesses with time is shown in FIG. 20 and a life curve indicating that substantially no access is made after a preset period of time is obtained. Generally, the curve shown in FIG. 20 can be expressed by the following equation (1).

$$P_{ACC} = A_0/(1 + a_1 t + a_2 t^2 + \ldots) \tag{1}$$

($P_{ACC}$: access prediction value, $A_0$, $a_1$, - - - : parameters, t, $t_1$, - - - : time).

The highly precise prediction can be attained by deriving the parameters in the equation (1) based on a variation in the number of past accesses and predicting the access frequency at the next time.

Figure 21:
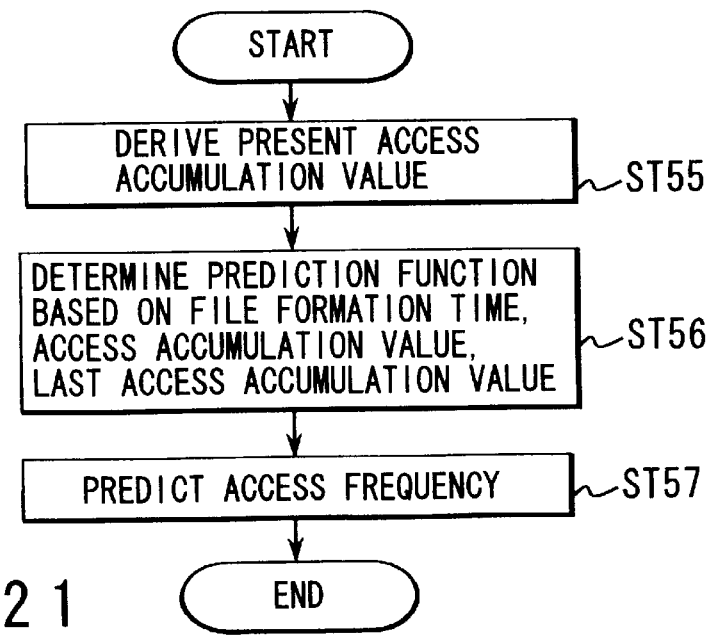
FIG. 21 is a flowchart for illustrating the access prediction process.

In this embodiment, as shown in FIG. 21, the present access accumulated value (the value accumulated up to the present time) is derived (ST55), the prediction function is determined based on the file formation time, the present access accumulated value and the last access accumulated value (ST56), and the next access frequency is predicted (ST57). For example, when the life characteristic function of the information is expressed by $P_{ACC} = A_0/(1 + a_1 t)$, the access accumulating function expressed by the following equation (2) is obtained by integrating the lift characteristic function by t.

$$S_{ACC} = (A_0/a_1) \log |1 + a_1 t| \tag{2}$$

Further, in the case of $P_{ACC} = A_0/(1 + a_2 t^2)$, the access accumulating function expressed by the following equation (3) is obtained by integrating the life characteristic function by t.

$$S_{ACC} = (A_0/a_2) \tan^{-1} (t/a_2) \tag{3}$$

If the accumulated value of accesses made in a period from the file formation time t0 to the last accumulated value totalizing time $t_1$ is $S_1$ and the accumulated value of accesses made in a period from the time $t_1$ to the present time t is S, the access prediction value is derived in the case of the equation (2) by deriving $A_0$ and $a_1$ from the following equations (4) and calculating the equation $P_{ACC} = A_0/\{1 + a_1(t + t0)\}$.

$$S_1 = (A_0/a_1) \log |1 + a_1(\text{time } t_1 - t_0)|$$
$$S = (A_0/a_1) \log |1 + a_1(t - t_0)| \tag{4}$$

Likewise, the access prediction value is derived in the case of the equation (3) by deriving $A_0$ and $a_2$ from the following equations (5) and calculating the equation $P_{ACC} = A_0/\{1+a_2(t-t_0)^2\}$.

$$S_1 = (A_0/a_2) \tan^{-1}\{(t_1-t_0)/a_2\}$$

$$S = (A_0/a_2) \tan^{-1}\{(t-t_0)/a_2\} \quad (5)$$

Figure 18:
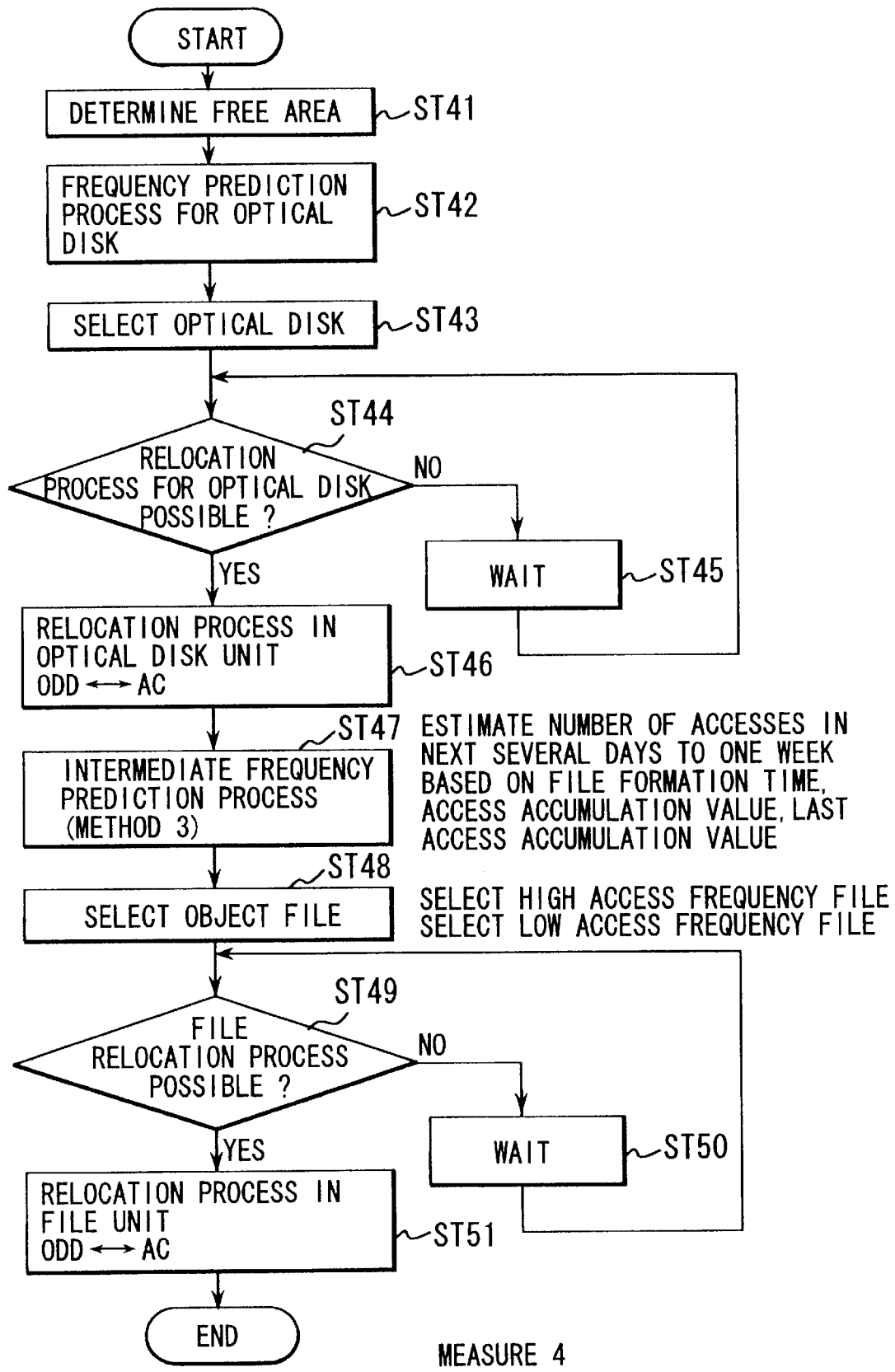
FIG. 18 is a flowchart for illustrating the low frequency measure (measure 4)

Then, a file of the largest access prediction value $P_{ACC}$ is selected as a high access file (measure 4) (ST48 in FIG. 18) and a file of the smallest access prediction value $P_{ACC}$ is selected as a low access file (measure 3) (ST27 in FIG. 17 and ST48 in FIG. 18).

In this case, the prediction process is effected by use of the two parameters of $A_0$, $a_1$ or $A_0$, $a_2$, but the precision of the prediction can be enhanced by increasing the number of parameters used. The number of parameters is determined by carefully considering the trade-off between the precision of the prediction and the overhead (cost) for the process.

Next, the measure 5 as the ultra low frequency measure by the ultra low frequency measure processing section 29 is explained with reference to the flowchart shown in FIG. 22.

The ultra low frequency measure effects the process of data relocation between the low frequency media (optical disks 8 received in the housing portion of the autochanger) based on information in the intermediate/low frequency medium management section 23 and the amount of information stored in the low frequency medium.

In this case, the process increases the free area by erasing or re-activation of data and suppresses a lowering in the utilization efficiency. If the free area in the low frequency media received in the housing portion of the autochanger exceeds a preset value, a low frequency medium for the relocation process is selected and the compaction process is effected. At this time, low frequency data must be concentrated on the low frequency medium on the assumption that the low frequency medium will be taken out from the autochanger later. Then, the empty region of the optical disk is calculated (ST61). When the optical disk desired is selected (ST62), the low access frequency prediction process (method 3) is effected (ST63). An object file is selected (ST64) and the process of data relocation between the low frequency media is effected (ST67).

Figure 23:
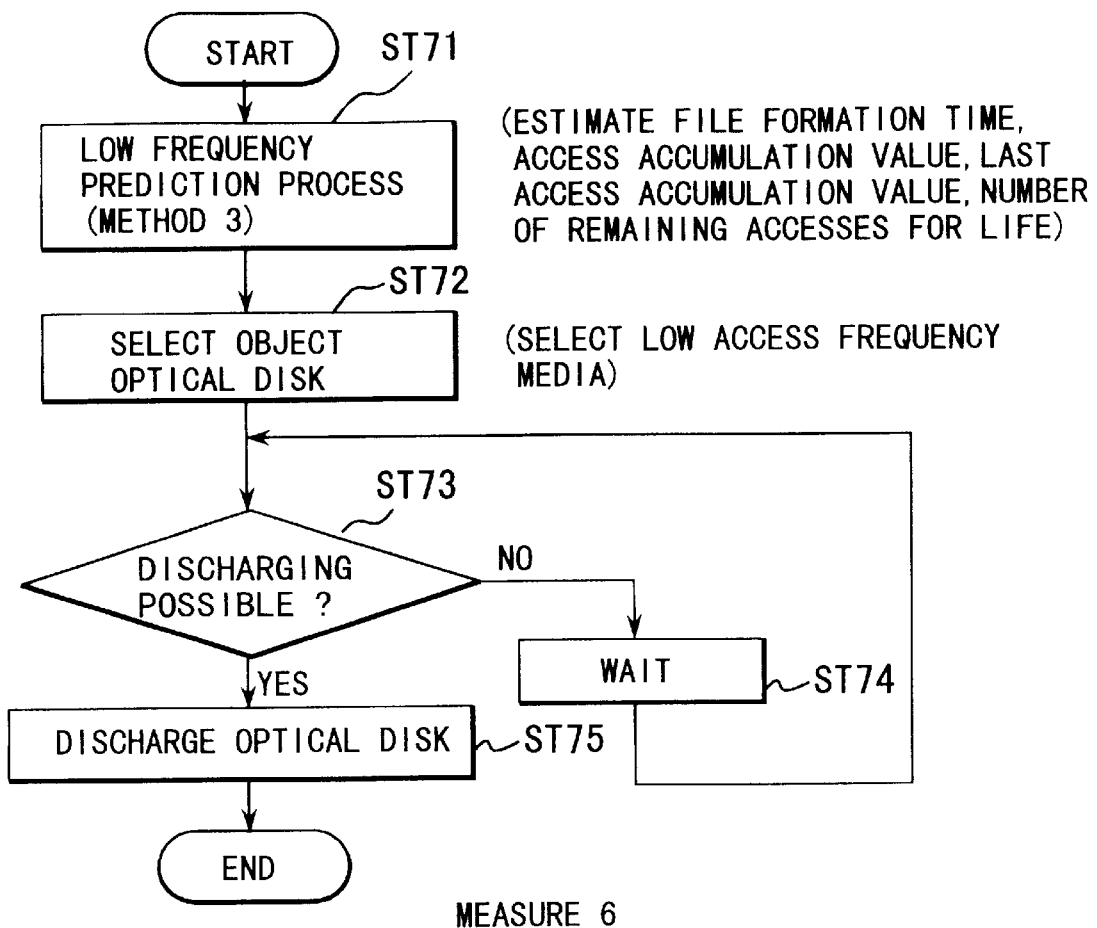
FIG. 23 is a flowchart for illustrating the carry-out measure (measure 6)

Next, the measure 6 as the carry-out measure by the optical disk inserting/discharging measure processing section 30 is explained with reference to the flowchart shown in FIG. 23.

The carry-out measure is a measure for selecting a low frequency medium to be carried out from the low frequency media (optical disks 8 received in the housing portion of the autochanger) so as to permit a new low frequency medium (optical disk 8) to be loaded and effects the above operation based on information in the ultra low frequency medium management section 24.

Like the case described before, a low frequency medium is selected by the low frequency prediction process (method 3) (ST71, ST72) and carried out (ST75). The basic method for concentration is based on the method disclosed in Jpn. Pat. Application No. 5-238437. Since, in the process, it is required to frequently move the autochanger, the timing of the relocation process is set to one month to one year in the case of the measure 6, although the timing of the relocation process is set to several days to one week in the case of the measure 4 and one week to one month in the case of the measure 5.

As described above, a case wherein the lowest frequency data in the media is relocated into the low-order medium is mainly explained, but there is a case wherein the highest frequency data is relocated into the high-order medium and the process is bi-directional. When data is transferred between the media, the information is deleted from the old medium management table and added into the new medium management table. At this time, attribute information such as access frequency is adequately changed and recorded in the new medium management table.

Next, the third feature of this invention is explained. As described before, as the precision of the prediction value of the access frequency of storage data is higher, the access performance can be maintained higher. However, some data is treated as data which is determined to be scarcely accessed based on the life characteristic of the data until recently, but the data is activated again in some cases when a new business is started, for example. In such a case, the access frequency prediction based on the access frequency curve must be corrected. For example, as shown in FIG. 24, there occurs a case wherein the access frequency rapidly increases at a certain time and a new life characteristic curve is made after the above time.

The feature of this invention resides in that a mechanism is provided to automatically detect the re-activation of data (i.e., an abrupt increase in the access frequency at a certain time).

FIG. 25 shows a management information table 21a' obtained by enlarging the column of the access frequency in the management information table 21a shown in FIG. 11. The column of the access frequency stores the access frequency counting starting time, present access accumulation value, last access accumulation value, and before-last access frequency accumulated value.

Figure 24:
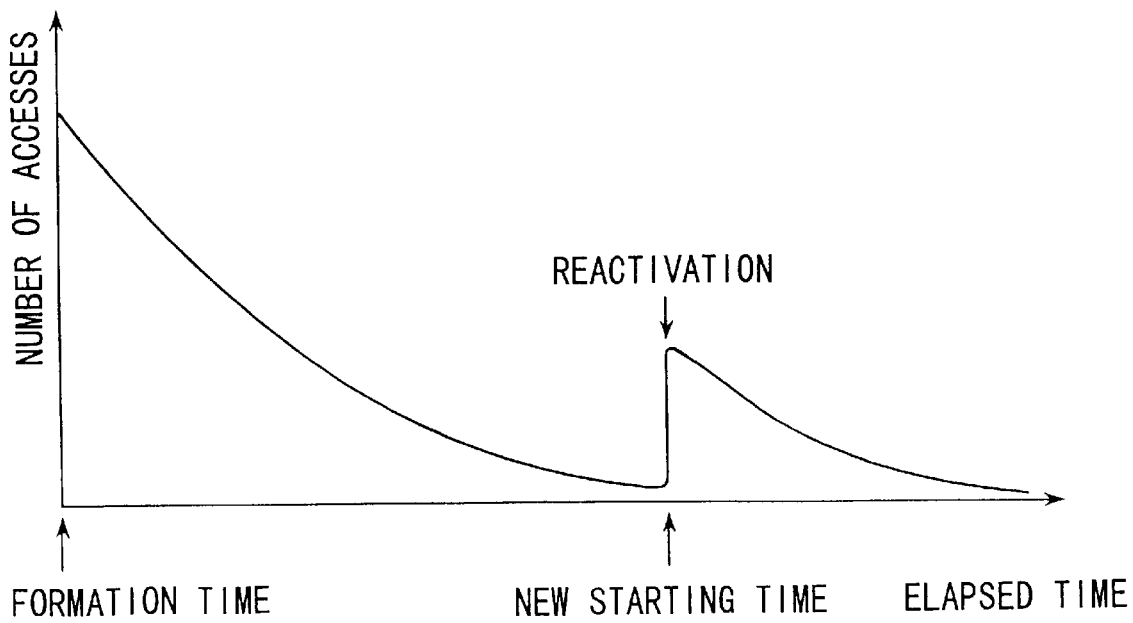
FIG. 24 is a diagram showing a variation in the accumulated value of the access frequency starting from the formation time with time.

The access frequency counting starting time is the same as the file formation time immediately after the file is formed, but if re-activation occurs as shown in FIG. 24, it is changed to the time of re-activation. The flowchart for determining the re-activation, that is, the flowchart for illustrating the process for correction of the access frequency which becomes necessary because of re-activation is shown in FIG. 26. That is, the prediction value of the access accumulation value is compared with the actual access accumulation value, and if a difference between them is larger than a preset threshold value, it is determined that re-activation has occurred.

The prediction value of the access accumulation value in the step ST81 is derived by the following procedure. In this example, since the access accumulation values at the last totalization time and the before-last totalization time are recorded, $A_0$, $a_1$ or $A_0$, $a_2$ can be derived by use of the equations (4), (5) if the last accumulation value is set to $S_1$, the before-last accumulation value is set to $S_2$, and counting times for the respective accumulation values are set to $t_1$ and $t_2$.

Then, the prediction value S at the present time t is calculated. At this time, if occurrence of re-activation is determined, the access frequency counting starting time is set to the last calculation time (ST83), the before-last access accumulation value is set to "0", the last access accumulation value is set as a difference between the present and last access accumulation values (ST84), and the storage content of the management information table 21a' is updated. As a result, the flexible access frequency prediction which can cope with a dynamic variation in the life characteristic of information can be attained.

The fourth feature of this invention is that when data is deleted, the process for actually deleting data is not effected but the process for setting the access frequency prediction value to the lowest value or "0" is effected. Therefore, in the device of this invention, since data can be recovered later and deleted data is automatically relocated to the lowest access frequency medium and automatically carried out from the device, the data management can be attained without lowering the performance of the system.

The relocation of data in an apparatus comprising a semiconductor memory, a magnetic disk drive, an optical disk drive and an automatic changer has been described above. Nonetheless, the method of relocating data, according to the present invention, is not limited to one designed for relocating data in a single apparatus.

An intermediate access frequency medium and a low access frequency medium need to be incorporated in one apparatus because the automatic changer is used. By contrast, a very high access frequency medium and an ultra-high access frequency medium can be incorporated in two apparatuses which operate independently of the apparatus incorporating the intermediate and low access frequency media. It is desirable that a very high access frequency medium or an ultra-high access frequency medium be incorporated in a network system having an application which must be accessed at high speed. A system of this type is shown in FIG. 27.

Figure 27:
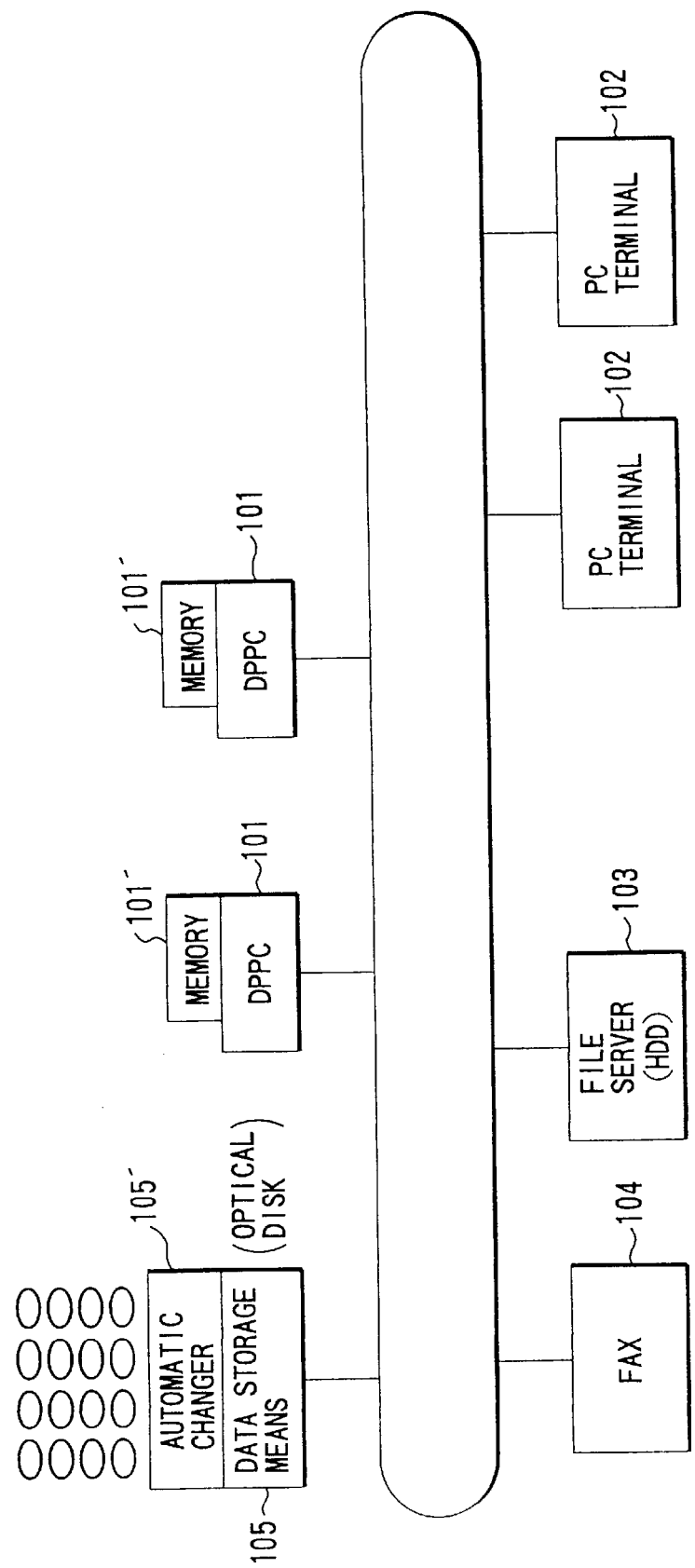
FIG. 27 is a diagram showing the schematic construction of a data storage system of another embodiment of the invention.

As shown in FIG. 27, the network system comprises digital PPCs 101, PC terminals 102, a file server 103, a facsimile 104, a data storage means 105, and memories 101'. The memories 101' can be automatically replaced by one another. In this system, the data stored in the memories 101' can be accessed at the highest speed. The data recorded on the hard disk incorporated in the file server 103 can be accessed at the second highest speed. The data recorded on the optical disk of the data storage means 105 is accessed at the lowest speed.

The data stored in the memory 101' of any digital PPC 101 (i.e., a printing terminal) can be printed faster than any other data stored in the digital PPC 101. Therefore, it is desirable that highest access frequency data, such as format data, be stored in the memory of a digital PPC 101. Document data or format data which is not used so often is recorded on the hard disk incorporated in the file server 103. Data which is used frequently but large in amount is stored in the file server 103 which can be accessed at the second highest speed. This is because a large amount of data may not be stored in the memory 101' of a digital PPC 101. Even if the data is stored in the memory 101' in its entirety, high access frequency data cannot be stored into the memory 101'. Document data which is used least often is recorded on the optical disk loaded in the data storage means 105. Document data items of low access frequency are recorded on one optical disk, which is moved within the automatic changer 105'.

In the system of FIG. 27, the access frequency of data is calculated in the same method as in the data relocation measure described above. Any file is moved to a recording medium which can be accessed at a speed proportional to the access frequency of the file. Namely, data of the highest access frequency is finally stored into the memory 101' of a digital PPC; data of the second highest access frequency into the file server 103; data of the third highest access frequency into the data storage means 105; and data of the lowest access frequency into the automatic changer 105'.

Data may not move to the memory 101' of a digital PPC, depending on its size, even if it is ultra-high access frequency data. For example, high access frequency data D1 is stored into the file server 103, not into the memory 101' if it is as large as to occupy two-thirds or more of the storage area which the memory 101' has for ultra-high access frequency data. However high is its access frequency, the data D1 is not moved to the memory 101' of any digital PPC. Hence, various types of high can be stored into the ultra-high access frequency data storage area of the memory 101'.

In the network system shown in FIG. 27, data may be relocated in real time while the data is being printed. How the data is relocated will be explained, with reference to the flow chart of FIG. 28.

First, the data to be printed is designated (ST90), is retrieved through the network (ST91), and is read from the medium storing the file (ST92). The data read from the medium is printed by a digital PPC 101 which is used as a printing terminal. (The PPC 101 may be replaced by a printer, which prints the data read from the medium.) At the same time the reading of data starts, the data relocation process is started, calculating the access frequency of the data (ST94). The access frequency data written in the management information table of the file is updated (ST95). Then, it is determined whether or not the access frequency updated is higher than the access frequency the data had before (ST96). If NO, the data need not be relocated, and the data is stored in the same medium (ST97). If YES, a region is attained in the medium having the immediately higher access speed (ST98). Next, it is determined whether or not a data-storing region has been attained in this medium (ST99). If YES, the data is recorded in the medium of the immediately higher access frequency (ST101) when it is determined that the data has been printed (ST100). If NO in ST99, the data is not relocated at all.

When a command is made for printing the document data stored in the file server 103, the operation is carried out to relocate the data while the data is being printed. If found to have an ultra-high access frequency, the data being printed (i.e. the data stored in the server 103 and just accessed) is stored into the memory 101' of a digital PPD 101 (i.e., a storage region of ultra-high access speed) after the data has been completely used (that is, it has been developed into image data). If not found inappropriate to be stored into the memory 101', the data will be recorded back onto the hard disk incorporated in the file server 103. To store the data into the memory 101' of the digital PPC 101 it is necessary to attain a storage region in the memory 101'. A storage region for the data is attained by moving the data of the lowest access frequency from the memory 101' into the file server 103.

It has been explained how data is moved so as to be printed by means of a digital PPC. The data is moved in the same way so as to be scanned and input by the digital PPC. The data input by scanning is stored into an ultra-high access speed medium or a high access speed medium provided in the digital PPC. As its access frequency changes, the data is moved to the medium having the access speed corresponding to the access frequency of the data.

Data is relocated between the automatic changer 105' and the hard disk incorporated in any PC terminal 102 is accomplished in the same way as among the automatic changer 105, the digital PPCs 101 and the file server 103.

According to this invention, it is possible to realize a highly flexible and high performance data storage device in which the management of the storage medium corresponding to the life characteristic of stored data can be attained, high performance access is made for data which is frequently accessed and the detail management corresponding to the life characteristic of data is provided for data of low frequency access and which can also cope with the record management using optical disks. In other words, according to this invention, it is possible to provide a data storage device in which the optimum relocation process for data in a plurality of types of data storage media formed in a hierarchical structure can be attained.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data storage system, comprising:

a plurality of data storage means for storing data, said data storage means having different speeds for access to the data stored in said data storage means, and constituting a hierarchical structure;

access frequency determining means for determining the frequencies of access to data items stored in said data storage means; and means for relocating the data items among said data storage means in accordance with characteristics of those of said data storage means which store data items accessed and with the access frequencies of the data items which have been determined by said access frequency determining means, said relocation means including access frequency calculating means for calculating the access frequencies of the data items, said access frequency calculating means including counting means for counting a number of times each data item has been accessed, wherein said data storage system further comprises first prediction means for predicting an access frequency for each data item on the basis of two counts made by said counting means at two points of time.

2. A data storage system, comprising:

a plurality of data storage means for storing data, said data storage means having different speeds for access to the data stored in said data storage means, and constituting a hierarchical structure;

access frequency determining means for determining the frequencies of access to data items stored in said data storage means; and means for relocating the data items among said data storage means in accordance with characteristics of those of said data storage means which store data items accessed and with the access frequencies of the data items which have been determined by said access frequency determining means, said relocation means including access frequency calculating means for calculating the access frequencies of the data items, said access frequency calculating means including counting means for counting the number of times each data item has been accessed, wherein said data storage system further comprises second prediction means for predicting an access frequency for each data item on the basis of two counts made by said counting means at two points of time, and determination means for determining re-activation of a data item when a difference between an access frequency predicted by said second prediction means and the access frequency calculated at present by said counting means is greater than a present threshold value, and in which, when said determination means determines that the data item has been re-activated, said counting means changes an earlier count to 0 and a later count to a value obtained by subtracting the later count from a present count, and said second prediction means predicts an access frequency for the data item on the basis of the earlier and later counts both changed by said counting means.

3. A data storage system, comprising:

first storage means having a first access speed, for storing data blocks having a first access-frequency;

first prediction means for predicting a future access frequency of each of the data blocks stored in said first storage means according to a first algorithm, said first prediction means including means for determining one of the data blocks stored in said first storage means in which a latest access time is oldest, as a low frequency data block;

second storage means having a second access speed, for storing data blocks having a second access-frequency;

second prediction means for predicting a future access frequency of each of the data blocks stored in said second storage means according to a second algorithm;

third storage means having a third access speed, for storing data blocks having a third access-frequency;

first relocation means for relocating into said second storage means those of the first access-frequency data blocks stored in said first storage means which are determined to have a low frequency of access in the future by said first prediction means; and second relocation means for relocating into said third storage means those of the second access-frequency data blocks stored in said second storage means which are determined to have a low frequency of access in the future by said second prediction means.

4. The system according claim 3, wherein said second prediction means includes means for determining a data block, in which a time interval between a present access time and a preceding access time is longest, as the low access frequency data block.

5. A data storage system, comprising:

first storage means having a first access speed, for storing data blocks having a first access frequency;

first prediction means for predicting a future access frequency of each of the data blocks stored in said first storage means according to a first algorithm, said first prediction means including means for determining a data block in which a time interval between a present access time and a preceding access time thereof is longest, as a low frequency data block;

second storage means having a second access speed, for storing data blocks having a second access-frequency;

second prediction means for predicting a future access frequency of each of the data blocks stored in said second storage means according to a second algorithm;

third storage means having a third access speed, for storing data blocks having a third access-frequency;

first relocation means for relocating into said second storage means those of the first access-frequency data blocks stored in said first storage means which are determined to have a low frequency of access in the future by said first prediction means; and second relocation means for relocating into said third storage means those of the second access-frequency data blocks stored in said second storage means which are determined to have a low frequency of access in the future by said second prediction means.

6. A data storage system comprising:

a plurality of types of data storage devices having different speeds for access to data stored in the data storage devices and constituting a hierarchical structure;

a plurality of access frequency determining means, provided for said plurality of data storage devices, respectively, for determining the frequencies of access to data items stored in said data storage devices according to characteristics of said data storage devices; and means for relocating the data items among said data storage devices in accordance with the access frequencies of the data items which have been determined by said access frequency determining means, said relocation means has access frequency calculating means for calculating the access frequencies of the data items based on the frequencies of access determined by said access frequency determining means, said access frequency calculating means including counting means for counting a number of times each data item has been accessed, wherein said data storage system further comprises first prediction means for predicting an access frequency for each data item on the basis of two counts made by said counting means at two points of time.

7. A data storage system comprising:

a plurality of types of data storage devices having different speeds for access to data store in the data storage devices and constituting a hierarchical structure;

a plurality of access frequency determining means, provided for said plurality of data storage devices, respectively, for determining the frequencies of access to data items stored in said data storage devices according to characteristics of said data storage devices; and means for relocating the data items among said data storage devices in accordance with the access frequencies of the data items which have been determined by said access frequency determining means, said relocation means has access frequency calculating means for calculating the access frequencies of the data items based on the frequencies of access determined by said access frequency determining means, said access frequency calculating means including counting means for counting a number of times each data item has been accessed, wherein said data storage system further comprises second prediction means for predicting an access frequency for each data item on the basis of two counts made by said counting means at two points of time, and determination means for determining re-activation of a data item when a difference between the access frequency predicted by said second prediction means and an access frequency calculated at present by said counting means is greater than a present threshold value, and in which, when said determination means determines that the data item has been re-activated, said counting means changes an earlier count to 0 and a later count to a value obtained by subtracting the later count from a present count, and said second prediction means predicts an access frequency for the data item on the basis of the earlier and later counts both changed by said counting means.

* * * * *